United States Patent
Tsuruoka

(10) Patent No.: US 10,075,382 B2
(45) Date of Patent: Sep. 11, 2018

(54) COMMUNICATION DEVICE, RELAY DEVICE, AND COMMUNICATION METHOD FOR A PLURALITY OF PACKETS

(71) Applicant: FUJITSU LIMITED, Kawasaki-shi, Kanagawa (JP)

(72) Inventor: Tetsumei Tsuruoka, Ichikawa (JP)

(73) Assignee: FUJITSU LIMITED, Kawasaki (JP)

( * ) Notice: Subject to any disclaimer, the term of this patent is extended or adjusted under 35 U.S.C. 154(b) by 117 days.

(21) Appl. No.: 14/952,369

(22) Filed: Nov. 25, 2015

(65) Prior Publication Data
US 2016/0182388 A1    Jun. 23, 2016

(30) Foreign Application Priority Data
Dec. 19, 2014  (JP) .................. 2014-257639

(51) Int. Cl.
*H04L 12/841* (2013.01)
*H04L 12/801* (2013.01)
*H04L 12/823* (2013.01)

(52) U.S. Cl.
CPC ............ *H04L 47/283* (2013.01); *H04L 47/19* (2013.01); *H04L 47/323* (2013.01)

(58) Field of Classification Search
CPC ...... H04L 47/19; H04L 47/283; H04L 47/323
See application file for complete search history.

(56) References Cited

U.S. PATENT DOCUMENTS

| | | | | |
|---|---|---|---|---|
| 5,550,848 A | * | 8/1996 | Doshi | .......... H04L 1/1848 |
| | | | | 714/749 |
| 6,920,504 B2 | * | 7/2005 | Bender | ............ H04L 47/323 |
| | | | | 370/231 |

(Continued)

FOREIGN PATENT DOCUMENTS

| JP | 2007-043373 A | 2/2007 |
|---|---|---|
| JP | 2007-060589 A | 3/2007 |

(Continued)

OTHER PUBLICATIONS

S. Floyd, "Limited Slow-Start for TCP with Large Congestion Windows", RFC: 3742, [online], Mar. 2004, [Searched on Mar. 18, 2014], <URL:http://tools.ietf.org/html/rfc3742>.

(Continued)

*Primary Examiner* — Jenee Holland
(74) *Attorney, Agent, or Firm* — Arent Fox LLP

(57) ABSTRACT

A communication device receives a first packet at a first receipt time, receives a plurality of packets after the first receipt time, the plurality of packets including a second packet, a third packet and a fourth packet, the second packet being received next to the first packet at a second receipt time, an interval between the first receipt time and the second receipt time exceeding a first time period, the plurality of packets being received at an interval shorter than the first time period, the third packet being received before an Nth packet among the plurality of packets, the fourth packet being any of the Nth and following packets among the plurality of packets, transmits a first acknowledgement for the third packet, hold a second acknowledgement for the fourth packet for a second time period, and transmits the second acknowledgement after holding the second acknowledgement for the second time period.

20 Claims, 25 Drawing Sheets

(56) References Cited

U.S. PATENT DOCUMENTS

| | | | |
|---|---|---|---|
| 2001/0027486 A1* | 10/2001 | Takamoto | H04L 1/1809 709/227 |
| 2002/0145976 A1* | 10/2002 | Meyer | H04L 1/1635 370/235 |
| 2002/0159396 A1* | 10/2002 | Carlson | H04L 1/1848 370/252 |
| 2003/0095537 A1* | 5/2003 | Murakami | H04L 1/1832 370/349 |
| 2004/0100964 A1* | 5/2004 | Robotham | H04L 1/1858 370/394 |
| 2004/0100979 A1* | 5/2004 | Mandin | H04L 1/1635 370/402 |
| 2004/0148396 A1* | 7/2004 | Meyer | H04L 1/1685 709/227 |
| 2004/0190540 A1* | 9/2004 | Miyake | H04L 1/1621 370/428 |
| 2004/0223506 A1* | 11/2004 | Sato | H04L 47/10 370/428 |
| 2005/0013246 A1* | 1/2005 | Miyake | H04L 1/0002 370/230 |
| 2005/0117515 A1* | 6/2005 | Miyake | H04L 1/1874 370/231 |
| 2007/0031117 A1 | 2/2007 | Abe | |
| 2007/0300120 A1* | 12/2007 | Kim | H04L 1/1851 714/749 |
| 2008/0165723 A1* | 7/2008 | Kim | H04L 47/10 370/318 |
| 2009/0216901 A1* | 8/2009 | Schloming | G06F 9/546 709/237 |
| 2009/0310500 A1* | 12/2009 | Matsuda | H04L 43/0864 370/252 |
| 2010/0274871 A1 | 10/2010 | Harrang et al. | |
| 2011/0286469 A1* | 11/2011 | Yasuda | H04L 1/188 370/412 |
| 2014/0269541 A1* | 9/2014 | Khude | H04W 72/042 370/329 |
| 2015/0029873 A1* | 1/2015 | Subramanian | G01S 5/14 370/252 |
| 2015/0333874 A1* | 11/2015 | Damola | H04L 1/0076 370/312 |
| 2015/0349934 A1* | 12/2015 | Pollack | H04L 5/0055 370/329 |

FOREIGN PATENT DOCUMENTS

| | | |
|---|---|---|
| JP | 2008-536339 A | 9/2008 |
| JP | 2008-236709 A | 10/2008 |
| JP | 2012-133792 A | 7/2012 |
| WO | WO 2006/056880 A2 | 6/2006 |

OTHER PUBLICATIONS

A. Aggarwal et al., "Understanding the Performance of TCP Pacing" IEEE INFOCOM, pp. 1157-1165, Mar. 2000.

* cited by examiner

FIG. 7

| Kind=8 | 10 | TS Value (TSval) | TS Echo Reply (Tsecr) |
|---|---|---|---|
| 1 | 1 | 4 | 4 |

FIG. 8A

CONNECTION MANAGEMENT INFORMATION

| No. | SOURCE IP ADDRESS | SOURCE TCP PORT | DESTINATION IP ADDRESS | DESTINATION TCP PORT | STATUS | START TIME | AGING TIMER |
|---|---|---|---|---|---|---|---|
| 1 | 192.168.1.13 | 31024 | 10.22.33.14 | 1014 | SYN | 10.24:13 | 100 |
| 2 | 192.168.1.221 | 11096 | 70.24.33.13 | 4055 | ESTAB | 10.24:13 | 2 |
| 3 | 192.168.1.14 | 33413 | 10.22.33.13 | 3379 | IDLE | 10.24:14 | 1 |
| 4 | 192.168.1.14 | 33072 | 160.2.1.23 | 3041 | FIN-W | 10.24:15 | 4 |
| 5 | 192.168.1.221 | 11097 | 158.80.11.5 | 2534 | ESTAB | 10.24:15 | 5 |
| 6 | 192.168.1.13 | 31229 | 170.5.4.4 | 1217 | ESTAB | 10.24:18 | 1 |
| 7 | 192.168.1.13 | 31230 | 161.2.33.7 | 845 | ESTAB | 10.24:18 | 3 |
| 8 | 192.168.1.13 | 31231 | 12.22.33.2 | 406 | ESTAB | 10.24:18 | 4 |
| 9 | 192.168.1.13 | 31232 | 11.22.33.8 | 338 | ESTAB | 10.24:18 | 170 |
| 10 | 192.168.1.14 | 33414 | 10.220.33.14 | 304 | FIN | 10.24:19 | 11 |
| 11 | 192.168.1.14 | 33415 | 10.111.33.14 | 253 | ESTAB | 10.24:19 | 1 |
| 12 | 192.168.1.11 | 5001 | 10.55.3.5 | 101 | IDLE | 10.24:19 | 0 |

FIG. 8B

| No. | PACKET TRAIN CONTROL INFORMATION ||||||| Ack SUSPENSION QUEUE INFORMATION |||
| | RTT OBSERVATION | NUMBER OF ELAPSED RTTS | Ack TRANSMISSION TIME | THRESHOLD Th1 | THRESHOLD Th2 | DELAY PERIOD | NUMBER OF SUSPENDED Acks | Ack SUSPENSION QUEUE HEAD ADDRESS | Ack SUSPENSION QUEUE TAIL ADDRESS |
|---|---|---|---|---|---|---|---|---|---|
| 1 | — | 0 | — | — | — | — | — | — | — |
| 2 | < 1 ms | — | — | — | — | — | — | — | — |
| 3 | < 1 ms | — | — | — | — | — | — | — | — |
| 4 | < 1 ms | — | — | — | — | — | — | — | — |
| 5 | 30 ms | 132 | 5321244432 | 2 ms | 10 | 0 | 0 | NULL | NULL |
| 6 | < 1 ms | — | — | — | — | — | — | — | — |
| 7 | 120 ms | 5 | 5321244430 | 2 ms | 3 | 15 ms | 1 | PPPP | PPPP |
| 8 | < 1 ms | — | — | — | — | — | — | — | — |
| 9 | 60 ms | 0 | 5321244420 | 2 ms | 3 | 30 ms | 2 | XXXX | YYYY |
| 10 | < 1 ms | — | — | — | — | — | — | — | — |
| 11 | 10 ms | 4 | 5321244431 | 2 ms | 2 | 2 ms | 0 | NULL | NULL |
| 12 | < 1 ms | — | — | — | — | — | — | — | — |

FIG. 23
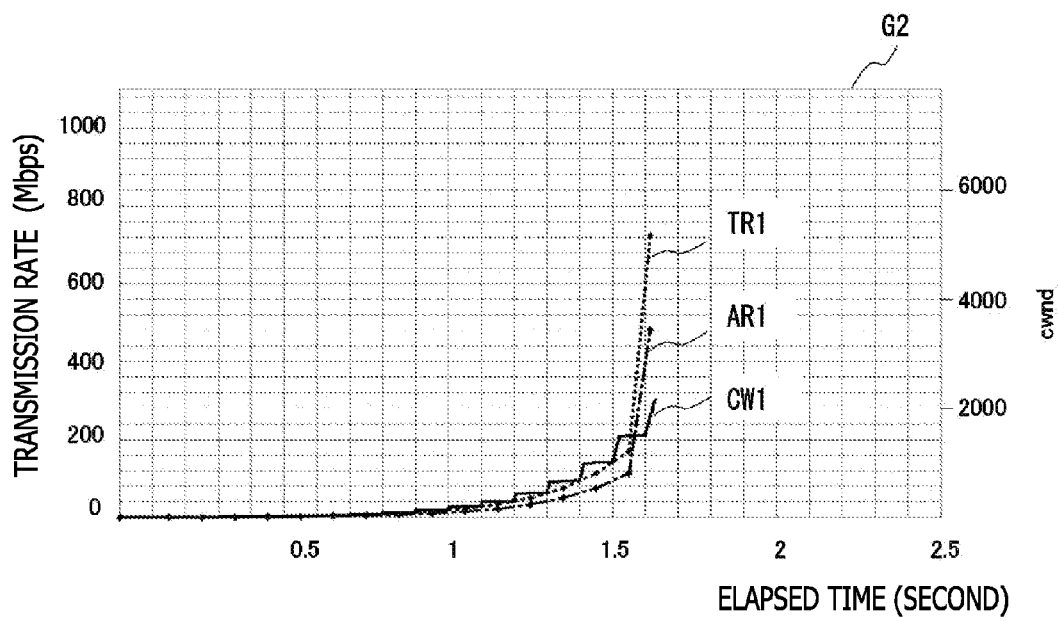
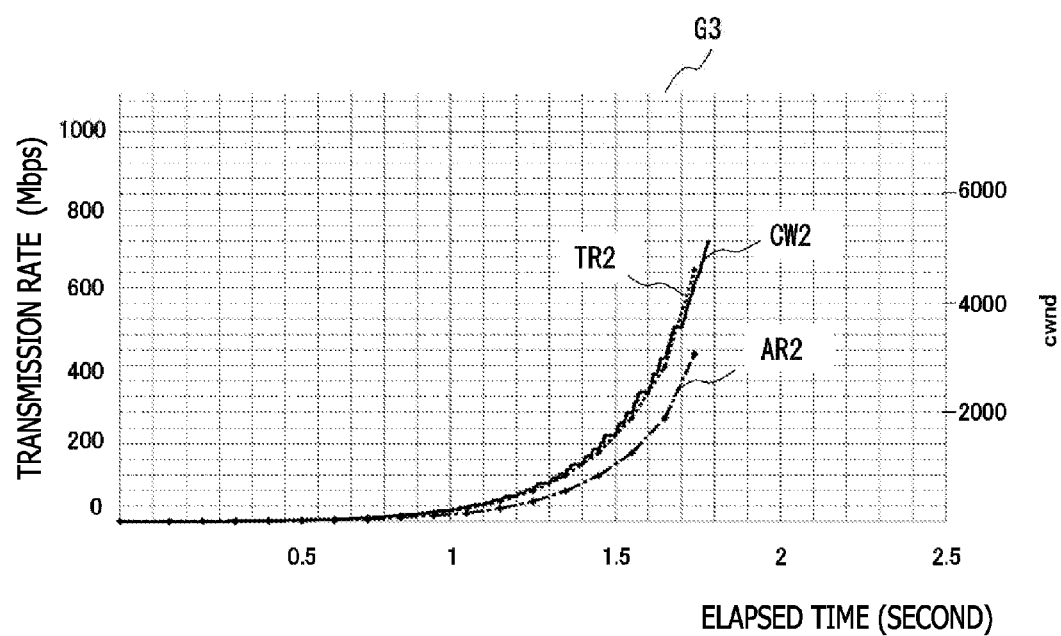

FIG. 24

| NOP(=1) | NOP(=1) | TSopt(=8) | 10 |
|---|---|---|---|
| TS Value (TSval) ||||
| TS Echo Reply (TSecr) ||||

COMMUNICATION DEVICE, RELAY DEVICE, AND COMMUNICATION METHOD FOR A PLURALITY OF PACKETS

CROSS-REFERENCE TO RELATED APPLICATION

This application is based upon and claims the benefit of priority of the prior Japanese Patent Application No. 2014-257639, filed on Dec. 19, 2014, the entire contents of which are incorporated herein by reference.

FIELD

The embodiments discussed herein are related to a communication device, a relay device, and a communication method.

BACKGROUND

Packet forwarding processing in a network may be performed in a network or lower layer, but the packet forwarding processing in the network or lower layer does not guarantee the packet to reach the intended destination. Then, a connection oriented protocol may be used in a transport layer in order to transmit the packet to the destination reliably. In communication using a connection, congestion control is performed because a usable transmission rate varies depending on network congestion and the like. For example, in transmission control protocol (TCP), processing called "slow start" using a congestion window (cwnd) is performed in order to adjust a transmission quantity of packets. In the slow start, after the start of communication with a destination device, a device on a transmitter side increases a transmission rate by incrementing the value of the congestion window every time an acknowledge packet is received, until detecting a packet loss. In this process, in response to an acknowledge packet as a trigger, the device on the transmitter side sends the device on the receiver side packets in a quantity equal to a total of the number of packets notified by the acknowledge packet as being successfully transmitted, and an increment in the value of the congestion window. In other words, the device on the transmitter side transmits packets upon receiving an acknowledge packet from the device on the receiver side, and subsequently waits until receiving another acknowledge packet. In this procedure, the packet transmission is performed in misaligned manner. If a mass of packets are transmitted at one time, a transmission rate during a period of intensive transmission of the packets is higher than an average transmission rate based on a round trip time (RTT) of a path between a communication device on a transmitter side and a communication device on a receiver side. For this reason, even a device or a link on the path may be able to process packets transmitted at the average transmission rate based on the RTT, it may fail to process packets on time during the period of intensive transmission of the packets, and therefore cause a packet loss. When a packet loss occurs during slow start processing, the communication device on the transmitter side decreases the transmission rate, and thereafter adjusts the transmission rate by changing the transmission rate only by a small rate. For this reason, if a packet loss occurs in communications at a relatively early point of time after the start of slow start processing, the transmission rate may hardly increase.

To address this, it has been proposed to set an upper limit on the increment of the congestion window so as to avoid packet discarding, which may otherwise occur due to a sudden increase in a communication rate in the slow start. In addition, there has been proposed a method of causing a device on a transmitter side to transmit packets at regular intervals so as to avoiding the packets from intensively arriving at a communication device on a receiver side in a short time. As documents of conventional techniques, there are "RFC 3742: Limited slow start" by S. Floyd, and "Understanding the performance of TCP pacing, IEEE INFOCOM, pp. 1157-1165, March 2000" by Aggarwal et al.

SUMMARY

According to an aspect of the invention, a communication device receives a plurality of packets and transmits a plurality of acknowledgement for each of the plurality of packets, the communication device includes a memory and a processor coupled to the memory and configured to receive a first packet at a first receipt time, receive a plurality of packets after the first receipt time, the plurality of packets including a second packet, a third packet and a fourth packet, the second packet being received next to the first packet at a second receipt time, an interval between the first receipt time and the second receipt time exceeding a first time period, the plurality of packets being received at an interval shorter than the first time period, the third packet being received before an Nth packet (N being a natural number more than two) counted from the second packet among the plurality of packets, and the fourth packet being any of the Nth and following packets counted from the second packet among the plurality of packets, transmit a first acknowledgement for the third packet, hold a second acknowledgement for the fourth packet for a second time period, and transmit the second acknowledgement after holding the second acknowledgement for the second time period.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a diagram illustrating an example of a time stamp;

FIG. 8A is a diagram illustrating an example of a connection management table;

FIG. 8B is a diagram illustrating the example of the connection management table;

FIG. 23 is a diagram illustrating an example of a simulation result; and

FIG. 24 is a diagram illustrating a modification of the time stamp.

DESCRIPTION OF EMBODIMENTS

Although there has been studied for devices on a transmitter side to resolve irregular intervals in packet transmission as described in the background, many devices, each of which does not resolve irregular intervals in packet transmission, are still present in a network. In this connection, there has not been proposed yet a method of avoiding a packet loss due to irregular intervals in packet transmission in the case where a device on a transmitter side does not resolve the irregular intervals in the packet transmission. In the background, the case where TCP is used as a protocol has been described as an example. However, a similar problem may arise in a protocol that adjusts a transmission rate by adjusting acknowledgement transmission/reception and the number of packets transmittable without receipt of an acknowledgement.

Figure 1:
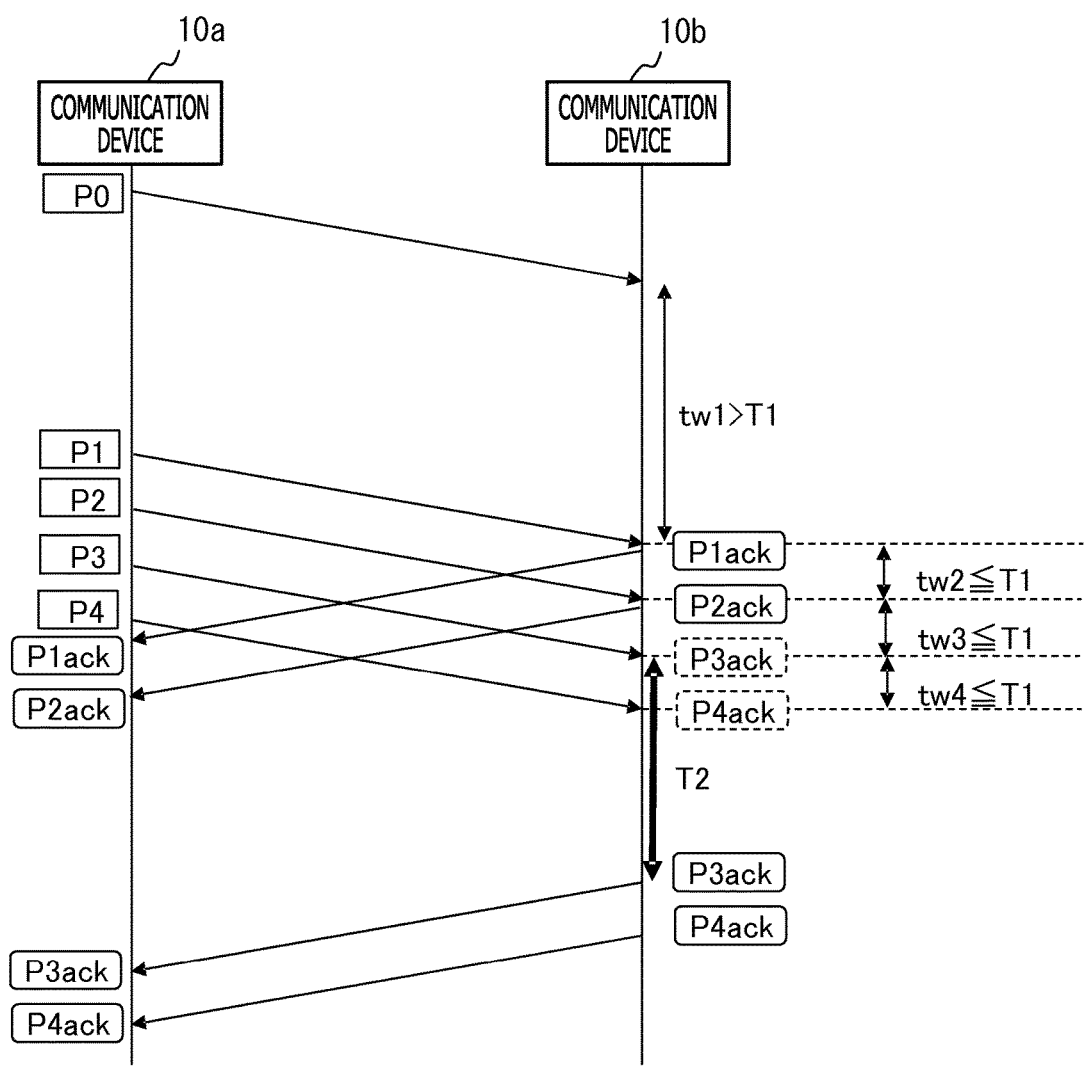
FIG. 1 is a diagram illustrating an example of a communication method according to an embodiment.

FIG. 1 is a diagram illustrating an example of a communication method according to an embodiment. An example of processing when packets P0 to P4 are transmitted from a communication device 10*a* to a communication device 10*b* will be described with reference to FIG. 1. Here, a time interval between receipt of the packet P0 and receipt of the packet P1 by the communication device 10*b* is tw1. Further, in the example illustrated in FIG. 1, a reception interval between receipt of the packet P1 and receipt of the packet P2 is tw2, a reception interval between receipt of the packet P2 and receipt of the packet P3 is tw3, and a reception interval between receipt of the packet P3 and receipt of the packet P4 is tw4, in the communication device 10*b*.

When receiving a packet, the communication device 10*b* determines whether packets are successively received, by using a result of comparing a first time (T1) to a reception interval between the packet currently received and the packet received immediately before. When the reception interval is T1 or less, the communication device 10*b* determines that the packets are successively received. In the example illustrated in FIG. 1, tw1 exceeds T1, but each of tw2 to tw4 is T1 or less. For this reason, the communication device 10*b* determines that the packet P0 and the packet P1 are not successively received, and determines that the packet P1 and the packet P2 are successively received when receiving the packet P2 following the packet P1.

When successively receiving packets, the communication device 10*b* transmits acknowledge packets for a predetermined quantity of packets without delay, but delays transmission of acknowledge packets for packet received after the received packets exceeds the predetermined quantity. FIG. 1 is an example of a case where the predetermined quantity is set to two packets. When successively receiving the packet P1 and the packet P2, the communication device 10*b* does not delay timing of transmission of acknowledge packets, because the number of the successively received packets does not exceed the predetermined quantity. For this reason, as illustrated in FIG. 1, transmission timing of each of an acknowledge packet (P1ack) for the packet P1 and an acknowledge packet (P2ack) for the packet P2 is not delayed.

Next, upon receiving the packet P3, the communication device 10*b* determines that three packets of the packets P1 to P3 are successively received, by using the reception interval between the packet P2 and the packet P3. Then, the communication device 10*b* determines that the number of the successively received packets exceeds the predetermined quantity set beforehand, and suspends an acknowledge packet (P3ack) for the packet P3 for a second time (T2), thereby delaying transmission timing of P3ack, by the second time. Similarly, when receiving the packet P4, the communication device 10*b* determines that four packets of the packets P1 to P4 are successively received, because tw4 is T1 or less. Then, as with the acknowledge packet for the packet P3, the communication device 10*b* delays transmission timing of an acknowledge packet (P4ack) for the packet P4.

Figure 2:
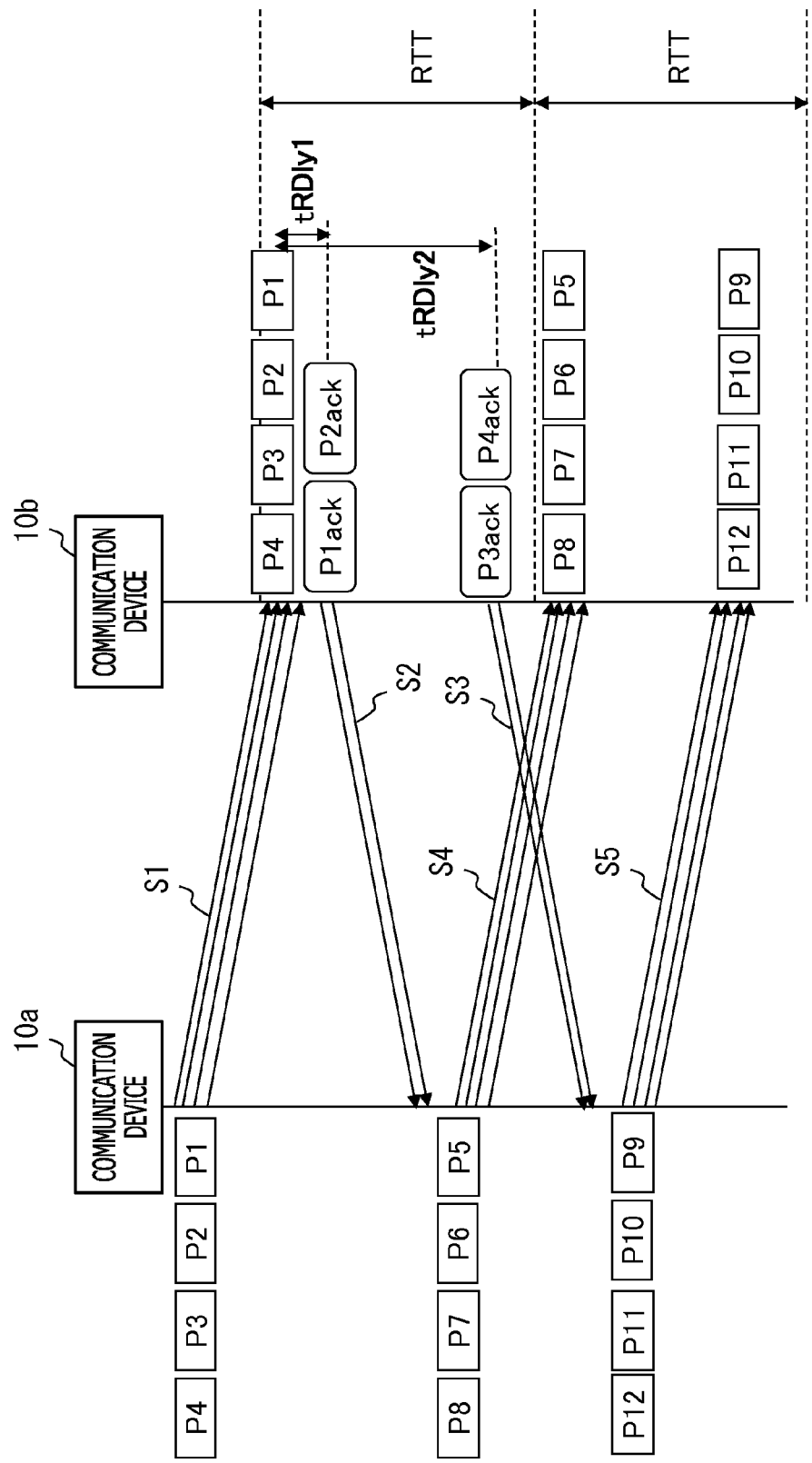
FIG. 2 is a diagram illustrating an example of timing of packet transmission/reception by communication according to an embodiment.

FIG. 2 illustrates an example of timing of packet transmission/reception by communication according to an embodiment. FIG. 2 represents processing performed in a period longer than a period in FIG. 1, and therefore collectively illustrates packets transmitted within a first time, as a packet group. Further, FIG. 2 illustrates an example of a case where communication using a congestion window is performed between the communication device 10*a* and the communication device 10*b*. Here, the congestion window (cwnd) is smaller than the number of packets, which are determined to be transmittable and receivable without receipt of an acknowledgement, by using capacity of a reception buffer in the communication device 10*b* and a transmission buffer in the communication device 10*a*. Furthermore, when a communication path is established between the communication device 10*a* and the communication device 10*b*, the communication device 10*a* and the communication device 10b may each measure a period (RTT) to be taken for a round trip of packets to/from the other. When the communication device 10b is allowed to acquire an RTT by measurement or the like, a time to delay an acknowledge packet is set to a value shorter than the RTT.

Assume that the communication device 10a transmits packets P1 to P4 to the communication device 10b, when the value of the congestion window to be used for communication with the communication device 10b becomes 4 in the communication device 10a (step S1). Meanwhile, the communication device 10a is assumed to be successively transmitting the packets in order of the packets P1, P2, P3, and P4 to the communication device 10b at time intervals equal to or less than a threshold Th1, in a manner similar to FIG. 1. The threshold Th1 corresponds to the first time (T1 in FIG. 1). The packet group formed of packets, which sequentially flow at short intervals in a network, will be hereinafter referred to as "packet train". The threshold Th1 is a threshold of a packet interval to detect the packet train. The packets P1 to P4 transmitted to the communication device 10b correspond to the packet train. Assume that, in the example illustrated in FIG. 2, the packets P1 to P4 all reach the communication device 10b.

The communication device 10b generates an acknowledgement to notify the communication device 10a that reception is successful, for every one of the packets P1 to P4. The communication device 10b receives the packets P1 to P4 as a packet train, and afterward receives no packet during an RTT period. Therefore, the communication device 10a performs packet transmission at irregular intervals. By performing the processing illustrated in FIG. 1, the communication device 10b transmits the acknowledgements without delay for the predetermined quantity of packets starting from the head of the packet train, but delays transmission of the acknowledgements for the packets received after the number of received packets exceeds the predetermined quantity. For example, when the predetermined quantity is two, the communication device 10b transmits an acknowledge packet (P1ack) for the packet P1 and an acknowledge packet (P2ack) for the packet P2 to the communication device 10a, without delay (step S2). Therefore, P1ack and P2ack are transmitted to the communication device 10a, after a lapse of a time tRDly1 consumed for packet processing in the communication device 10b, from receipt of the packet train of the packets P1 to P4.

The communication device 10b transmits acknowledge packets (P3ack and P4ack) for the packets P3 and P4 to the communication device 10a, by delaying transmission timing by the second time (step S3). In the example illustrated in FIG. 2, the second time is shorter than the RTT for the communication with the communication device 10a. For this reason, P3ack and P4ack are transmitted toward the communication device 10a, after a lapse of a time tRDly2 from receipt of the packet train of the packets P1 to P4.

Meanwhile, when receiving P1ack and P2ack, the communication device 10a determines that the transmission of each of the packets P1 and P2 is successful, and increments the congestion window. FIG. 2 illustrates a case where the value of the congestion window is incremented by one every time an acknowledge packet is received. The communication device 10a receives the two acknowledge packets, and therefore increments the congestion window from 4 to 6. The transmission is not yet confirmed as successful for the two packets of the packets P3 and P4, and thus, the communication device 10a determines to transmit newly four packets to the communication device 10b. Therefore, the communication device 10a transmits a packet train including packets P5 to P8 to the communication device 10b (step S4).

Assume that, after transmitting the packets P5 to P8 to the communication device 10b, the communication device 10a receives P3ack and P4ack from the communication device 10b. Then, by performing processing similar to step S4, the communication device 10a further increments the congestion window by two. Therefore, the congestion window becomes 8. At this moment, whether the transmission is successful is unclear, for four packets of the packets P5 to P8. Therefore, the communication device 10a assumes four packets, which are determined by subtracting the number of unclear packets from the value of the congestion window, to be packets that may be newly transmitted to the communication device 10b. The communication device 10a transmits a packet train including packets P9 to P12 to the communication device 10b (step S5).

As illustrated in FIG. 2, after transmitting the acknowledge packets for the packets P1 to P4, the communication device 10b receives eight packets of the packets P5 to P12 in a state of being divided into two packet trains. Further, the communication device 10b receives both of the packet train including the packets P5 to P8 and the packet train including the packets P9 to P12, before a lapse of the RTT from the time of receiving the packet P5. In other words, irregularity of intervals in packet transmission in the communication device 10a is reduced, as the communication device 10b delays the acknowledge packets for some of the packets. When the irregularity of the intervals in the packet transmission is reduced, a temporary rise in the transmission rate during the RTT period is suppressed, as compared with a case where packets are intensively transmitted. For this reason, as compared with the case where packets are intensively transmitted, a packet loss due to the temporary rise in the transmission rate is less likely to occur in a bottleneck link in a path between the communication device 10a and the communication device 10b. Therefore, an occurrence of a packet loss may be avoid, until the value of the congestion window increments to the extent that the transmission rate becomes relatively high, during slow start processing.

<First Embodiment>

Figure 3:
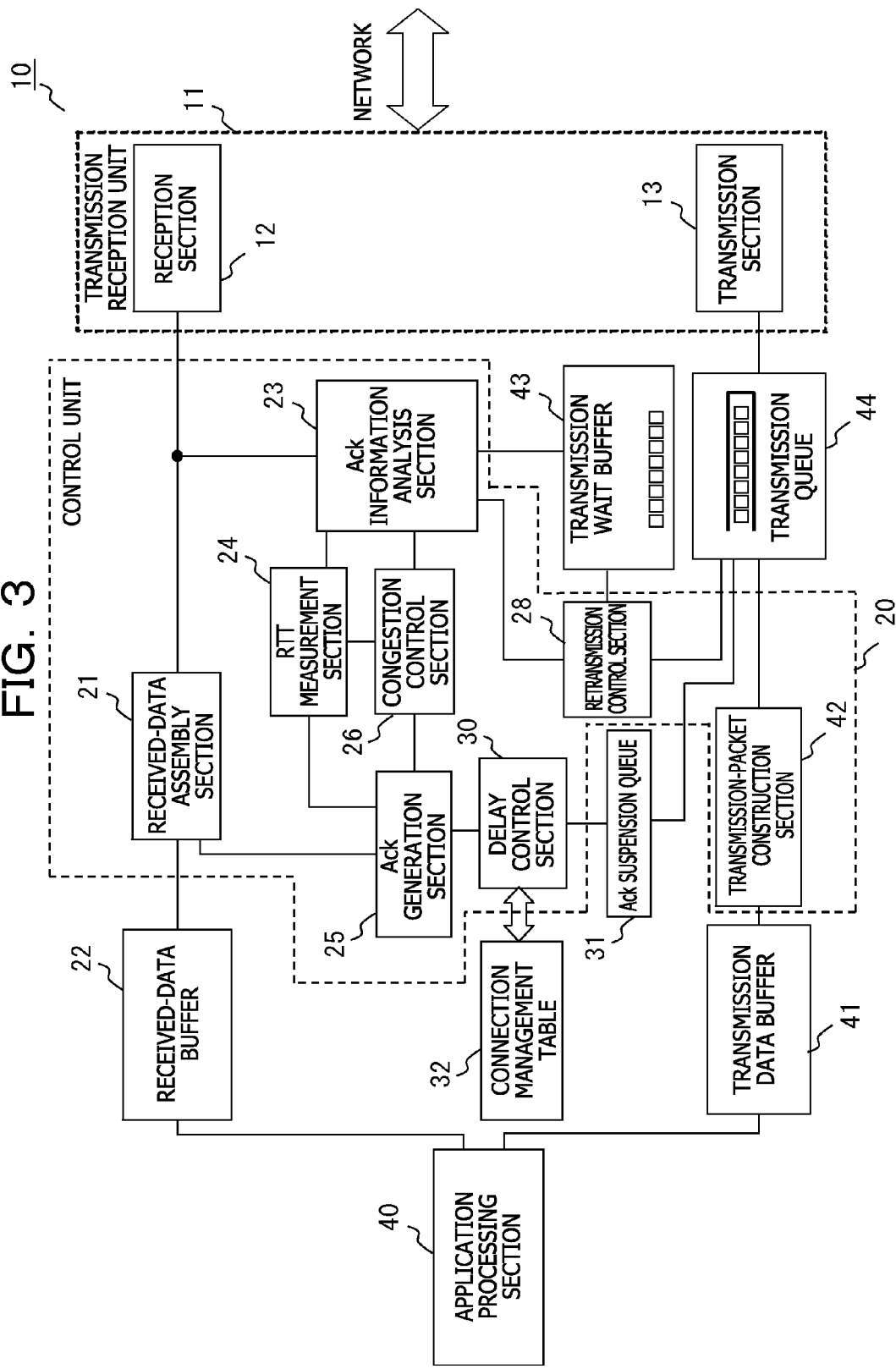
FIG. 3 is a diagram illustrating an example of a configuration of a communication device according to a first embodiment.

FIG. 3 illustrates an example of a configuration of a communication device 10 according to a first embodiment. The communication device 10 includes a transmission reception unit 11, a control unit 20, a received-data buffer 22, an application processing section 40, an Ack suspension queue 31, a connection management table 32, a transmission data buffer 41, a transmission wait buffer 43, and a transmission queue 44. The transmission reception unit 11 has a reception section 12 and a transmission section 13. The control unit 20 has a received-data assembly section 21, an acknowledge packet (Ack) information analysis section 23, an RTT measurement section 24, an Ack generation section 25, a congestion control section 26, a retransmission control section 28, a delay control section 30, and a transmission-packet construction section 42. A case where the communication device 10 communicates with a communication partner by using TCP will be described below as a specific example.

The reception section 12 receives a packet transmitted from other device, and outputs the received packet to the received-data assembly section 21 and the Ack information analysis section 23. The transmission section 13 transmits a packet or an acknowledge packet read out from the transmission queue 44.

The received-data assembly section 21 extracts segments from the received packet, reproduces transmitted data, and outputs the reproduced data to the received-data buffer 22. The received-data buffer 22 outputs the data to the application processing section 40.

When the communication device 10 transmits data to other device, the Ack information analysis section 23 determines whether transmission of a packet is successful, by using a sequence number in an acknowledge packet received from a transmitter. The Ack information analysis section 23 deletes a successfully transmitted packet, from the transmission wait buffer 43. Meanwhile, for a packet failed in transmission, the Ack information analysis section 23 requests the retransmission control section 28 to perform retransmission. The retransmission control section 28 performs retransmission processing, by reading out a packet to be retransmitted, from the transmission wait buffer 43, and outputting the read-out packet to the transmission queue 44. The congestion control section 26 adjusts the value of a congestion window for a connection being in communication, according to the number of received acknowledge packets.

The RTT measurement section 24 measures an RTT for a communication partner, by using a transmission time of a packet transmitted by the communication device 10 and a value of a time stamp in an acknowledge packet for the transmitted packet. Meanwhile, when the communication device 10 receives a data packet from a communication partner, the RTT measurement section 24 calculates an RTT, by using a time stamp in the data packet and a receipt time of the packet. The Ack generation section 25 generates an acknowledge packet indicating a reception result for the data packet received by the communication device 10 from the communication partner.

The delay control section 30 decides timing of transmission of the acknowledge packet generated by the Ack generation section 25, based on the RTT. The delay control section 30 does not delay acknowledge packets for packets counted from the head of a packet train to one immediately before a threshold Th2. Meanwhile, for a packet at a position in reception order when counted from the head of the packet train, if a number representing the position is equal to or greater than the threshold Th2, timing of transmission of an acknowledge packet is delayed in a range less than the RTT. The delay control section 30 holds a to-be-delayed acknowledge in the Ack suspension queue 31, and outputs a to-be-transmitted acknowledge packet to the transmission queue 44. The connection management table 32 holds information such as a source address, a destination address, and an RTT, for each connection.

The transmission data buffer 41 holds transmission data generated in the application processing section 40. The transmission-packet construction section 42 generates a packet including data in the transmission data buffer 41, and outputs the generated data to the transmission queue 44.

Figure 4:
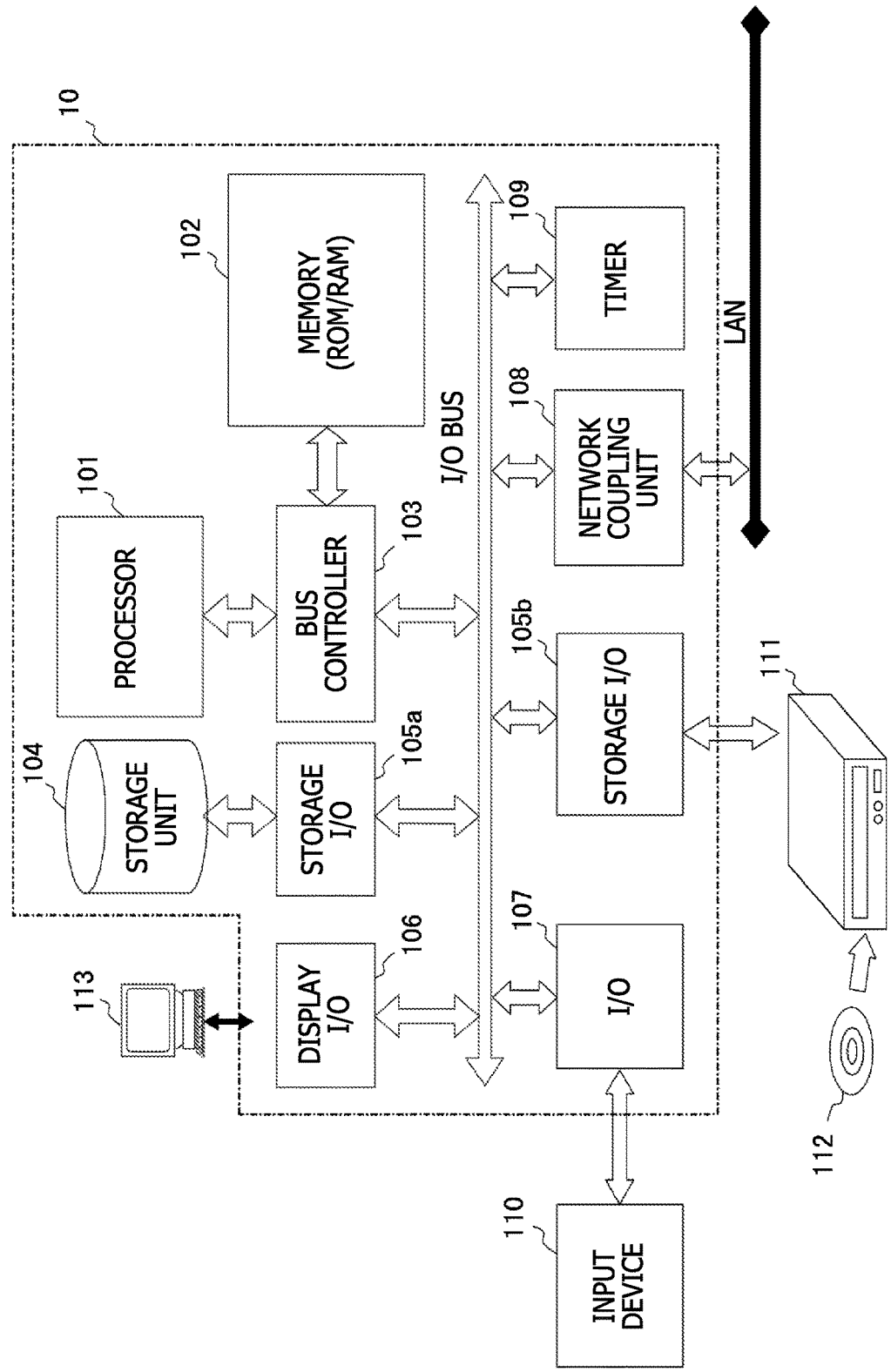
FIG. 4 is a diagram illustrating an example of a hardware configuration of the communication device.

FIG. 4 is a diagram illustrating an example of a hardware configuration of the communication device 10. The communication device 10 includes a processor 101, a memory 102, a bus controller 103, a storage unit 104, an input/output (I/O) bus, a network coupling unit 108, and a timer 109. Further, the communication device 10 includes storage I/Os 105 (105a and 105b), a display I/O 106, and an I/O 107. The processor 101 may be any type of processor including a central processing unit (CPU). The processor 101 operates as the received-data assembly section 21, the Ack information analysis section 23, the RTT measurement section 24, the Ack generation section 25, the congestion control section 26, the retransmission control section 28, the delay control section 30, the application processing section 40, and the transmission-packet construction section 42. The processor 101 reads a program stored in the storage unit 104, and performs processing by using the memory 102 as a working memory, as appropriate. The memory 102 includes a random access memory (RAM) and a read only memory (ROM). The memory 102 operates as the received-data buffer 22, the Ack suspension queue 31, the transmission data buffer 41, the transmission wait buffer 43, and the transmission queue 44. Further, the memory 102 holds data to be used for the processing by the processor 101 and data obtained by the processing by the processor 101. The network coupling unit 108 operates as the transmission reception unit 11. The timer 109 operates as a part of the RTT measurement section 24, the delay control section 30, and the like.

The bus controller 103 couples the processor 101 and the memory 102 to each other in a manner enabling data input/output. Further, the storage I/O 105b, the display I/O 106, and the I/O 107 couple the communication device 10, to an optical disk drive 111, a display 113, and an input device 110 to each other in a manner enabling data input/output. The optical disk drive 111 may be used to read data from a portable storage medium 112 and to write data to the portable storage medium 112, as appropriate. The processor 101 may execute a program recorded in the portable storage medium 112.

Figure 5:
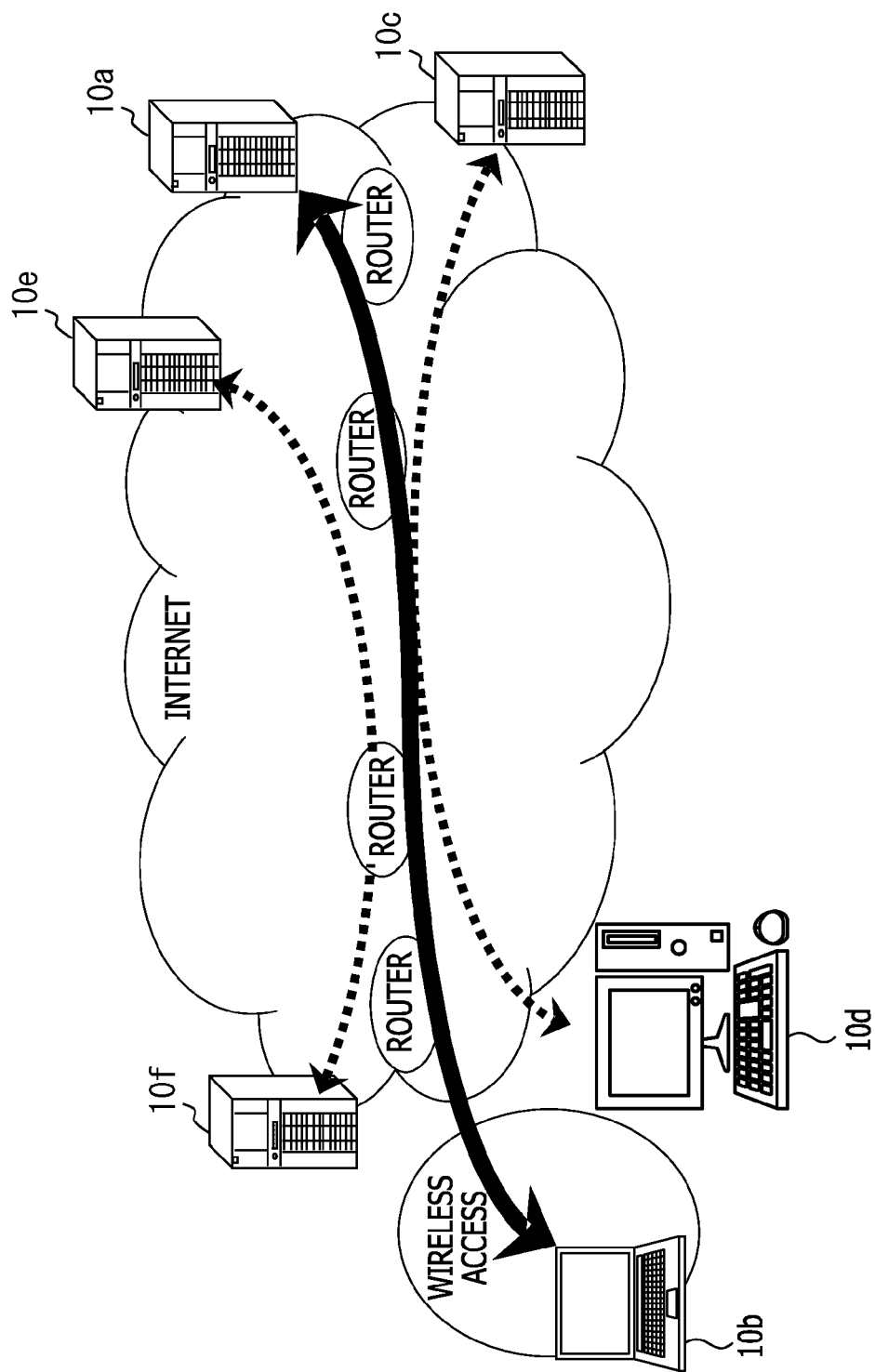
FIG. 5 is a diagram illustrating an example of a network.

FIG. 5 illustrates an example of a network. In the example of the network illustrated in FIG. 5, the communication device 10a and the communication device 10b communicate with each other via the Internet. The communication device 10b is in a wireless access network, and communicates with the communication device 10a, via a router in the wireless access network and a router in the Internet. The communication method according to the embodiment is applicable to a device not positioned in the wireless access network, unlike the communication device 10b. For example, a communication device 10c and a communication device 10d communicate with each other via the Internet, and the communication device 10c operates as a server, whereas the communication device 10d operates as a client. In this case, the communication method according to the embodiment is applicable to both of the communication device 10c and the communication device 10d. Further, the communication method according to the embodiment is also applicable to servers communicating with each other via the Internet, such as a communication device 10e and a communication device 10f. FIG. 5 illustrates the case where the communication devices communicate with each other via a router, as an example. However, communication may be performed via a device other than the router, such as a switch, for example.

Figure 6:
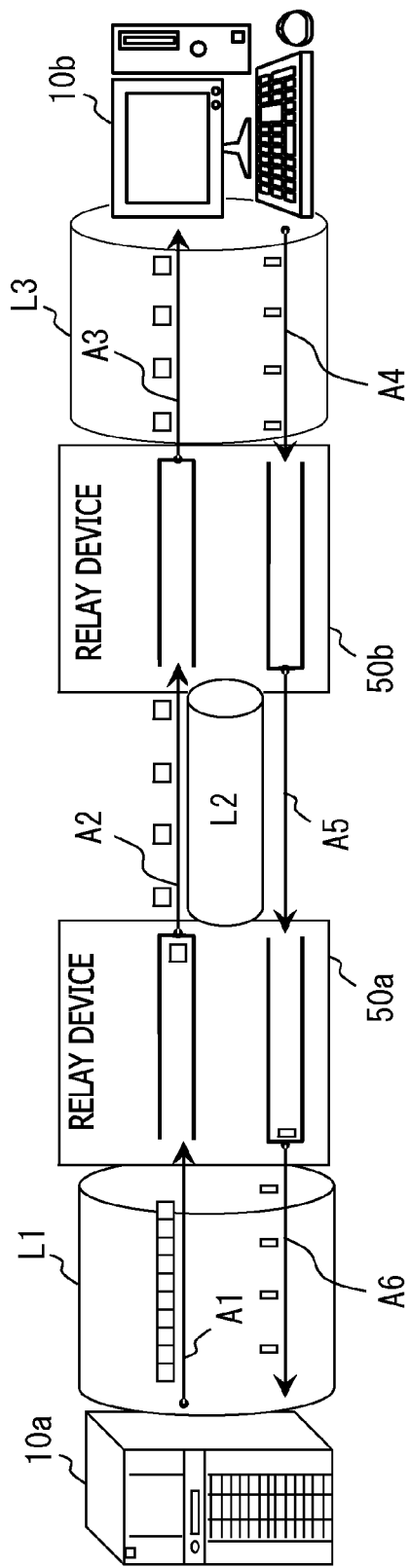
FIG. 6 is a diagram illustrating an example of a communication path.

FIG. 6 is a diagram illustrating an example of a communication path. FIG. 6 illustrates an example of a communication path, in a case where the communication device 10a communicates with the communication device 10b via a relay device 50a and a relay device 50b. The relay devices 50a and 50b may each be any type of relay device such as a router and a switch. The communication device 10a and the relay device 50a are coupled by a link L1. Similarly, the relay device 50a and the relay device 50b are coupled by a link L2, and the relay device 50b and the communication device 10b are coupled by a link L3. The following description is provided by taking, as an example, a case where a communication rate usable for communication between the communication device 10a and the communication device 10b in the link L2 is lower than a communication rate in each of the links L1 and L3. When the communication device 10a transmits packets destined for the communication device 10b at a transmission rate usable in the link L1, as indicated by an arrow A1, the relay device 50a holds the received packets in a buffer. The relay device 50a forwards the packets to the relay device 50b by using a transmission rate usable in the link L2, as indicated by an arrow A2. In other words, the relay device 50a holds packets waiting to be forwarded to the relay device 50b in the buffer, among the packets received from the communication device 10a. The relay device 50b receives the packets destined for the communication device 10b at the transmission rate permitted in the link L2 from the relay device 50a, and then forwards the received packets to the communication device 10b via the link L3, as indicated by an arrow A3. In this process, the relay device 50b forwards the packets to the communication device 10b, at a reception rate used when receiving the packets from the relay device 50a. Therefore, the relay device 50b may perform forwarding processing between the communication device 10a and the communication device 10b, without accumulating the packets in a buffer. The communication device 10b receives the packets transmitted from the communication device 10a, at a forwarding rate permitted in the link L2. The communication device 10b transmits acknowledge packets for the received packets, toward the communication device 10a. The acknowledge packets are forwarded to the communication device 10a, in a path opposite to the path for the packets, as indicated by arrows A4, A5, and A6.

Next, there will be described details of processing performed in the communication device 10b, from a stage where a connection between the communication device 10a and the communication device 10b is established. This description will be provided by taking, as an example, a case where the communication device 10b communicating in the path illustrated in FIG. 6 is the communication device 10 according to the first embodiment. In the following description, an alphabet following the reference numeral of the communication device 10 may be added to a reference numeral, to recognize easily which one of the communication devices performs processing. For example, the delay control section 30 included in the communication device 10b will be referred to as "delay control section 30b". In addition, the following description will be provided by taking, as an example, a case where the forwarding rate usable in the link L2 is half the rate in the link L1.

First, the communication device 10b establishes a communication path with the communication device 10a. A control packet to perform a three-way handshake between the communication device 10b and the communication device 10a is transmitted and received, and a time stamp is included in the control packet. The time stamp is included in an option field in a TCP header.

FIG. 7 illustrates an example of the time stamp. The time stamp includes a kind field, a time stamp length field, a time stamp value (TS Value) field, and a time stamp echo reply field. The kind field is a value representing the kind of the time stamp, and is set to 8 in the example illustrated in FIG. 7. The time stamp length field represents the number of bytes to be used in the time stamp, and is 10 bytes in the example illustrated in FIG. 7. FIG. 7 illustrates a case where each of the kind field and the time stamp length field is 1 byte, and each of the time stamp value field and the time stamp echo reply field is 4 bytes. The time stamp value field stores a value indicating a transmission time of a packet. The time stamp echo reply field stores a value indicating a transmission time of an acknowledge packet.

Assume that the communication device 10b receives a control packet, in which an Ack bit in a TCP header is set to 1, as an acknowledgement for a control packet transmitted by the communication device 10b. The RTT measurement section 24b acquires the control packet via the reception section 12b and the Ack information analysis section 23, and determines an RTT between the communication device 10b and the communication device 10a, by using the value of each of the time stamp value field and the time stamp echo reply field in the control packet. The RTT measurement section 24b stores the value of the determined RTT, in the connection management table 32b.

FIGS. 8A and 8B are diagrams illustrating an example of the connection management table 32. The connection management table 32 includes connection management information, packet train control information, and Ack suspension queue information. FIG. 8A illustrates details of the connection management information, and FIG. 8B illustrates details of the packet train control information and the Ack suspension queue information.

The connection management information includes an Internet Protocol (IP) address of a source, a source TCP port, a destination IP address, a destination TCP port, a status, a start time, and an aging timer. Here, the status is a value representing the status of each connection, and the start time is a value indicating the time when communication begins for each connection. The aging timer indicates, for each connection, the time remaining until the entry of this connection is deleted as invalid information. The value of the aging timer is reset every time packet transmission/reception is newly performed.

The packet train control information includes an RTT observation result, the number of elapsed RTTs, an Ack transmission time, the threshold Th1, the threshold Th2, and a delay period. Here, the number of elapsed RTTs represents how many times an RTT has elapsed, based on the time when a packet for which delay processing of an acknowledge packet is to be performed is received in the connection. The Ack transmission time is the time when the last acknowledge packet is transmitted, for the connection. In the example illustrated in FIGS. 8A and 8B, a case, in which the Ack transmission time is a transmission time represented as a count value of the timer that counts the time by 1 millisecond, is taken as an example.

The threshold Th2 is used to determine the number of packets for which acknowledgements are not to be delayed, among the packets successively received by the communication device 10. For each packet train, the threshold Th2 represents the position of a packet, for which the delay processing of an acknowledge packet is to be performed, when counted from the head in the packet train. Acknowledge packets are not to be delayed in a packet train of a length less than the threshold Th2, and therefore, the threshold Th2 may also be regarded as a threshold used to determine whether to delay an acknowledge packet. The threshold Th2 may also be referred to as "packet train length threshold". For example, the threshold Th2 is 10 in a No. 5 connection, and therefore, the delay processing of the acknowledge packet is performed for the tenth and subsequent packets from the head of the packet train. The delay period represents a period (the second time, or T2) to delay an acknowledge packet to be subjected to the delay processing, for the connection. For example, in a No. 9 connection, the delay period is 30 milliseconds, and therefore, an acknowledge packet selected to be delayed is transmitted 30 milliseconds later than a transmission time of a case with no delay.

The threshold Th1 is used for determination as to whether packets are successively received (the first time, or T1). In other words, the threshold Th1 is a maximum of a reception interval between packets in a packet train, and is used to detect the head packet of the packet train. Therefore, the threshold Th1 may also be referred to as "packet train determination threshold". When an elapsed time from receipt of the last packet until receipt of the next packet is equal to or greater than the threshold Th1, the next packet is determined to be the head of the packet train, for the connection. The delay control section 30b sets the packet train length threshold (Th2) and the packet train determination threshold (Th1), when a connection is established. The delay control section 30b holds beforehand a threshold set by a user according to a communication partner, and sets the threshold according to an IP address of a source.

The Ack suspension queue information includes the number of suspended Acks, an Ack suspension queue head address, and an Ack suspension queue tail address. The number of suspended Acks is the number of acknowledge packets held in the Ack suspension queue 31. The Ack suspension queue head address is an address in the memory 102, for the head of an area used for the connection, in the Ack suspension queue 31. The Ack suspension queue tail address is an address in the memory 102, for the tail of an area used for the connection, in the Ack suspension queue 31.

In the following description, establishment of a path and measurement of an RTT are assumed to be performed, for the No. 9 connection in the connection management table 32 illustrated in FIGS. 8A and 8B. A result of measuring the RTT in the RTT measurement section 24b is assumed to be 60 milliseconds. When an RTT is recorded in the connection management table 32b for a newly established connection, the delay control section 30b decides a delay period for this connection. The delay control section 30b sets a value half the RTT, as the first delay period. In this example, the RTT is 60 milliseconds in the No. 9 connection, and therefore, the delay control section 30b sets 30 milliseconds as the delay period.

Next, an example for a change in the amount of use of the buffer and communication processing in the relay device 50a will be described. The description will be provided by taking, as an example, a case where transmission of a data packet from the communication device 10a to the communication device 10b is started by establishment of communication between the communication device 10a and the communication device 10b.

The application processing section 40a of the communication device 10a outputs data to be transmitted to the communication device 10b, to the transmission data buffer 41a. The transmission-packet construction section 42a generates a transmission packet, by attaching an IP header, a TCP header, and the like, to the data acquired from the transmission data buffer 41a. The generated packet is stored in the transmission queue 44a, and then transmitted from the transmission section 13a. Here, assume that the congestion window in the communication device 10a is set to 4, and four packets of packets P1 to P4 are transmitted toward the communication device 10b.

Figure 9:
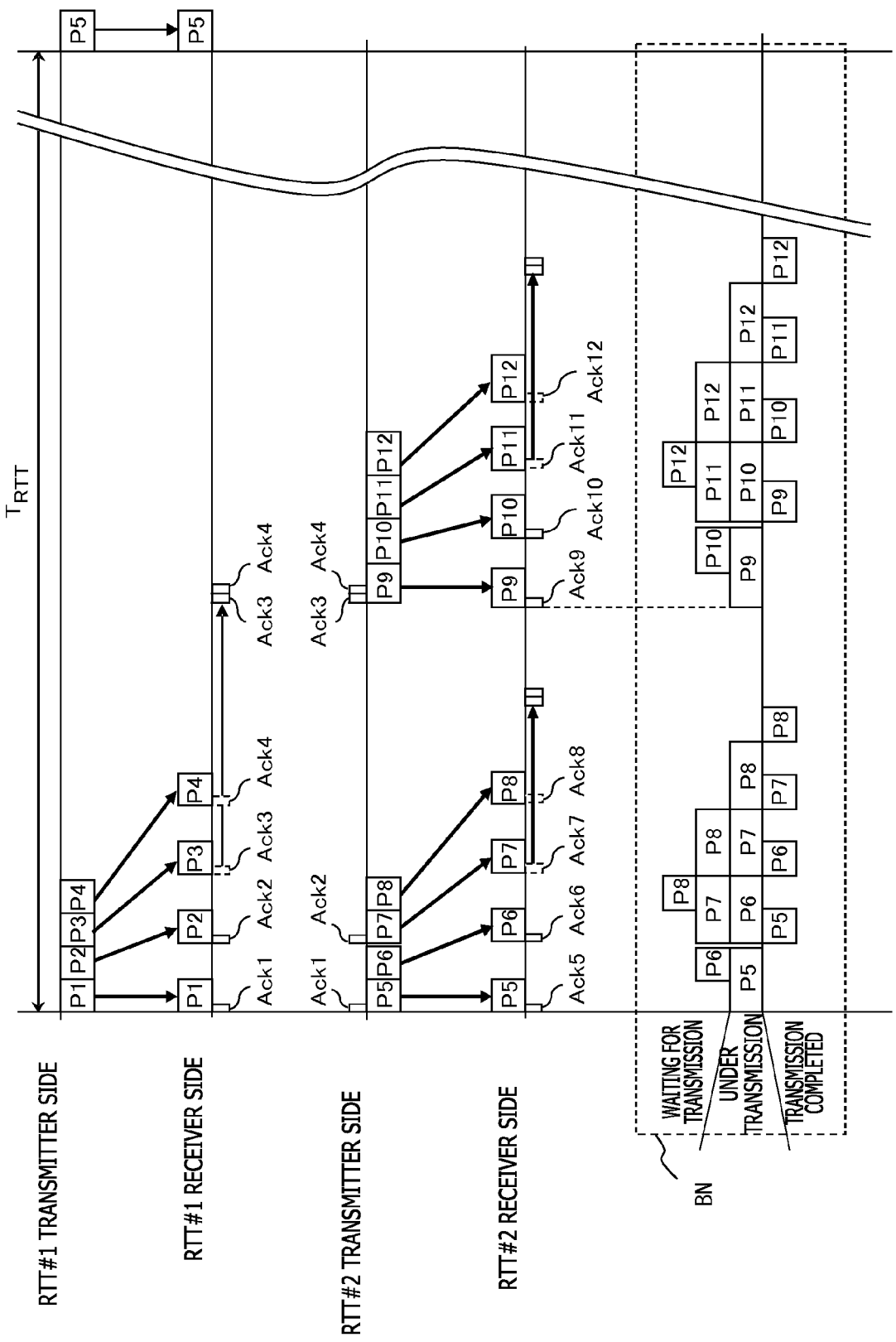
FIG. 9 is a diagram illustrating an example of a relationship between packet transmission/reception, and an amount of use of a buffer in a device coupled to a bottleneck link.

FIG. 9 is a diagram illustrating an example of a relationship between packet transmission/reception, and an amount of use of a buffer in a device coupled to a bottleneck link. For easy understanding, FIG. 9 illustrates information about packets transmitted by using the No. 9 connection. A top section (an RTT#1 transmitter side) of FIG. 9 illustrates transmission timing of packets from the communication device 10a in a first RTT period when communication begins. Assume that, when the communication device 10a transmits a packet train including four packets of the packets P1 to P4, in the communication device 10a, the transmission timing of the packets based on the head of the packet train is what is illustrated on the RTT#1 transmitter side in FIG. 9. Note that $T_{RTT}$ in FIG. 9 is the length of an RTT between the communication device 10a and the communication device 10b.

Assume that the packets P1 to P4 are forwarded to the communication device 10b, via the path illustrated in FIG. 6. The packets P1 to P4 reach the communication device 10b via the link L2, which is a bottleneck link, and therefore, the communication device 10b receives the packets P1 to P4 at the forwarding rate in the link L2. Timing of receiving the packets P1 to P4 by the communication device 10b is assumed to be what is illustrated in a second section (an RTT#1 receiver side) of FIG. 9. On the RTT#1 receiver side of FIG. 9, the timing of receiving the packets is illustrated based on receipt of the packet P1, so that the reception intervals of the packets P1 to P4 are easily compared with the transmission intervals of the packets P1 to P4 in the communication device 10a.

Upon receiving the packets P1 to P4 via the reception section 12b, the received-data assembly section 21b of the communication device 10b extracts segments of each packet, thereby restoring data, and outputs the restored data to the received-data buffer 22b. The application processing section 40b reads out the reception data from the received-data buffer 22b, as appropriate. Further, the received-data assembly section 21b provides notification of a reception result of each data packet, to the Ack generation section 25b. Assume that the received-data assembly section 21b also outputs information that identifies the connection, when outputting the data and providing the notification of the reception result. Here, the Ack generation section 25b is assumed to be notified that the reception is successful for every one of the packets P1 to P4. The Ack generation section 25b generates an acknowledge packet indicating that the reception is successful for every one of the packets P1 to P4, and outputs the generated acknowledge packet to the delay control section 30b.

The delay control section 30b monitors a reception interval of packets for each connection, and determines whether a period from a receipt time of the latest packet to a receipt time of the packet received immediately before is equal to or greater than the packet train determination threshold (Th1). Here, a case where a time from receipt of the control packet to receipt of the packet P1 exceeds 2 milliseconds is taken as an example. Then, the delay control section 30b determines that an acknowledge packet for a new packet train is generated.

Next, the delay control section 30b determines whether the number of packets included in the packet train is equal to or greater than the packet train head threshold (Th2). When the number of packets included in the packet train is equal to or greater than the threshold Th2, the delay control section 30b decides to delay acknowledge packets, for the packet corresponding to the threshold Th2 and the subsequent packets. In this example, the threshold Th2 is 3 (No. 9 in FIG. 8B). In other words, the delay control section 30b does not delay the first and second acknowledge packets, and delays the third and subsequent acknowledge packets, among the acknowledge packets for the packets received successively.

On the RTT#1 receiver side of FIG. 9, timing for transmission of the acknowledge packets from the communication device 10b to the communication device 10a is also illustrated. In FIG. 9, Ack1 and Ack2 are acknowledge packets to provide notification of successful receipt of the packets P1 and P2, respectively. The delay control section 30b does not delay the acknowledge packets for the first and second packets in the packet train, and therefore outputs Ack1 and Ack2 to the transmission queue 44b, without holding Ack1 and Ack2 in the Ack suspension queue 31b. The packets held in the transmission queue 44b are sequentially transmitted by the transmission section 13b, and therefore, Ack1 and Ack2 are transmitted toward the communication device 10a, when the packets P1 and P2 are successfully received, as illustrated in FIG. 9.

Meanwhile, the delay control section 30b holds an acknowledge packet (Ack3) for the packet P3 in the Ack suspension queue 31b, to delay the timing of transmission thereof, by a delay period. An acknowledge packet (Ack4) for the packet P4 is also held in the Ack suspension queue 31b, so that the timing of transmission thereof comes after the transmission of Ack3. The delay period is assumed to be a period recorded in the field of the delay period in the connection management table 32 (FIGS. 8A and 8B). Here, the delay period is set to a value longer than the packet train determination threshold (Th1), to divide the packet train. In the example illustrated in FIGS. 8A and 8B, the delay period of the acknowledge packet for the No. 9 connection is 30 milliseconds. Therefore, the delay control section 30b outputs Ack3 to the transmission queue 44b after holding Ack3 in the Ack suspension queue 31b for 30 milliseconds. Further, Ack4 is also outputted to the transmission queue 44b, after Ack3. Therefore, as illustrated in FIG. 9, the timing of the transmission of Ack3 and Ack4 is delayed by a period half the RTT. In other words, an idle time corresponding to the delay period from the transmission of Ack2 to the transmission of Ack3 and Ack4 is provided.

After a lapse of a time corresponding to the RTT in the No. 9 connection from the receipt of the packet P1 by the communication device 10b, the delay control section 30b increments the number of elapsed RTTs in the No. 9 connection by one, in the connection management table 32b. Further, the delay control section 30b sets the delay period to a half, namely, 15 milliseconds. In other words, the delay control section 30b calculates the delay period, based on RTT/2^(n+1). Here, "n" is the value of the number of elapsed RTTs.

After a lapse of a time corresponding to the RTT in the No. 9 connection from the transmission of the packet P1 in the communication device 10a, the communication device 10a receives Ack1 from the communication device 10b, as illustrated in a third section (on an RTT#2 receiver side) of FIG. 9. Upon receipt of Ack1 via the reception section 12a, the Ack information analysis section 23a of the communication device 10a deletes the packet P1 from the transmission wait buffer 43a. Further, the congestion control section 26a increases the congestion window from 4 to 5. The transmission-packet construction section 42a generates two packets (P5 and P6), which correspond to the sum of one packet corresponding to the received acknowledge packet and one packet transmissible as a result of increasing the congestion window, and outputs the generated packets to the transmission queue 44a. The packets P5 and P6 are transmitted toward the communication device 10b, as illustrated in FIG. 9.

Illustrated in a BN of FIG. 9 is a change in the amount of use of the buffer in the relay device 50a coupled to the transmitter side of a link that becomes a bottleneck in the communication path between the communication device 10a and the communication device 10b. Upon receipt of the packet P5, the relay device 50a performs forwarding processing for the packet P5. Forwarding processing for one packet to the link L2 takes a time twice as long as the time consumed for transmission of one packet by the communication device 10a in the link L1. For this reason, the relay device 50a receives the packet P6 during the transmission of the packet P5, and holds the packet P6 in the buffer.

Meanwhile, in the communication device 10a, reception processing for Ack2 and transmission processing for new packets P7 and P8 accompanying the receipt of Ack2 are performed. The processing performed in the transmission of the packets P7 and P8 is similar to the processing in the transmission of the packets P5 and P6.

At the time when the packet P7 reaches the relay device 50a, the relay device 50a is in the middle of performing the forwarding processing for the packet P6 after completing the forwarding of the packet P5. For this reason, the packet P7 is held in the buffer in the relay device 50a. Next, at the time when the packet P8 reaches the relay device 50a, the relay device 50a is still in the middle of performing the forwarding processing for the packet P6, and therefore, the packet P8 is also held in the buffer in the relay device 50a.

The communication device 10a does not transmit a new packet until receiving Ack3, but the timing of the transmission of the acknowledge packets (Ack3 and Ack4) for the packets P3 and P4 is delayed in the communication device 10b. For this reason, a new packet is not transmitted from the communication device 10a, until the forwarding processing for the packets P7 and P8 in the relay device 50a is completed, as illustrated in the BN of FIG. 9. In other words, the amount of available space in the buffer of the relay device 50a is restored by delaying Ack3 and Ack4.

An example of processing when the packets P5 to P8 reach the communication device 10b is illustrated in a fourth section (an RTT#2 receiver side) of FIG. 9. When the packets P5 to P8 reach the communication device 10b, processing similar to the processing for the receipt of the packets P1 to P4 is performed in the communication device 10b. In other words, Ack5 and Ack6 that are acknowledge packets for the packets P5 and P6, respectively, are not delayed, while transmission of Ack7 and Ack8 that are acknowledge packets for the packets P7 and P8, respectively, is delayed for the delay period.

Here, the delay period is changed from 30 milliseconds to 15 milliseconds, after the lapse of the period corresponding to the length of the RTT from the receipt of the packet P1. For this reason, Ack7 is outputted to the transmission queue 44b, after being held in the Ack suspension queue 31b for 15 milliseconds. Ack8 is outputted to the transmission queue 44b, so that the transmission time of Ack8 comes after the transmission time of Ack7. Therefore, an idle time of 15 milliseconds is provided between the transmission of Ack6 and the transmission of Ack7.

Afterward, when Ack3 and Ack4 reach the communication device 10a, the communication device 10a performs reception processing for Ack3 and Ack4. Further, the communication device 10a increments the congestion window to 8 as a result of receiving Ack3 and Ack4, and performs transmission processing for new packets P9 to P12. The processing of Ack3 and Ack4 and the processing performed in the transmission of the packets P9 to P12 are similar to the processing of Ack1 and the processing performed in the transmission of the packets P5 and P6, respectively.

Upon receipt of the packet P9, the relay device 50a performs forwarding processing for the packet P9, as illustrated in the BN of FIG. 9. Further, the relay device 50a receives the packet P10 during the transmission of the packet P9, and therefore holds the packet P10 in the buffer. The packets P11 and P12 reach the relay device 50a while the relay device 50a performs the forwarding processing for the packet P10, and therefore, the relay device 50a stores the packets P11 and P12 as well in the buffer, and sequentially processes the packets staying in the buffer.

As illustrated on the RTT#2 receiver side of FIG. 9, there is a period during which the communication device 10b receives no packet after the receipt of the packet P8, and then receives the packets P9 to P12. Therefore, when the packets P9 to P12 reach the communication device 10b, processing similar to the processing in the receipt of the packets P5 to P8 is performed in the communication device 10b. In other words, Ack9 and Ack10 that are acknowledge packets for the packet P9 and P10, respectively, are not delayed, while transmission of Ack11 and Ack12 that are acknowledge packets for the packets P11 and P12, respectively, is delayed for the delay period. In other words, it may be said that the packets P9 to P12 are processed as a new packet train. Subsequently, after a lapse of the RTT from the receipt of the packet P5, the delay control section 30b further halves the period to delay the transmission of the next acknowledge packet, based on the calculation formula of $RTT/2^{(n+1)}$.

By the processing described using FIG. 9, the data packets and the acknowledge packets are transmitted and received between the communication device 10a and the communication device 10b, and therefore, the irregularity of intervals in packet transmission in the communication device 10a is alleviated as the communication processing continues. For this reason, the transmission rates of the packets in the communication device 10a are also averaged by the RTT. In addition, when the transmission rates are averaged by the RTT, a value to be set as the delay period becomes small, and thus an effect by the delay processing is expected to become small. For this reason, the delay control section 30b may stop the delay processing of the transmission of the acknowledge packet, when a calculated value of the delay period becomes less than a predetermined threshold. In this case, while a burden on the communication device 10 may be decreased, the unevenness of the transmission rate may also be alleviated.

Figure 10:
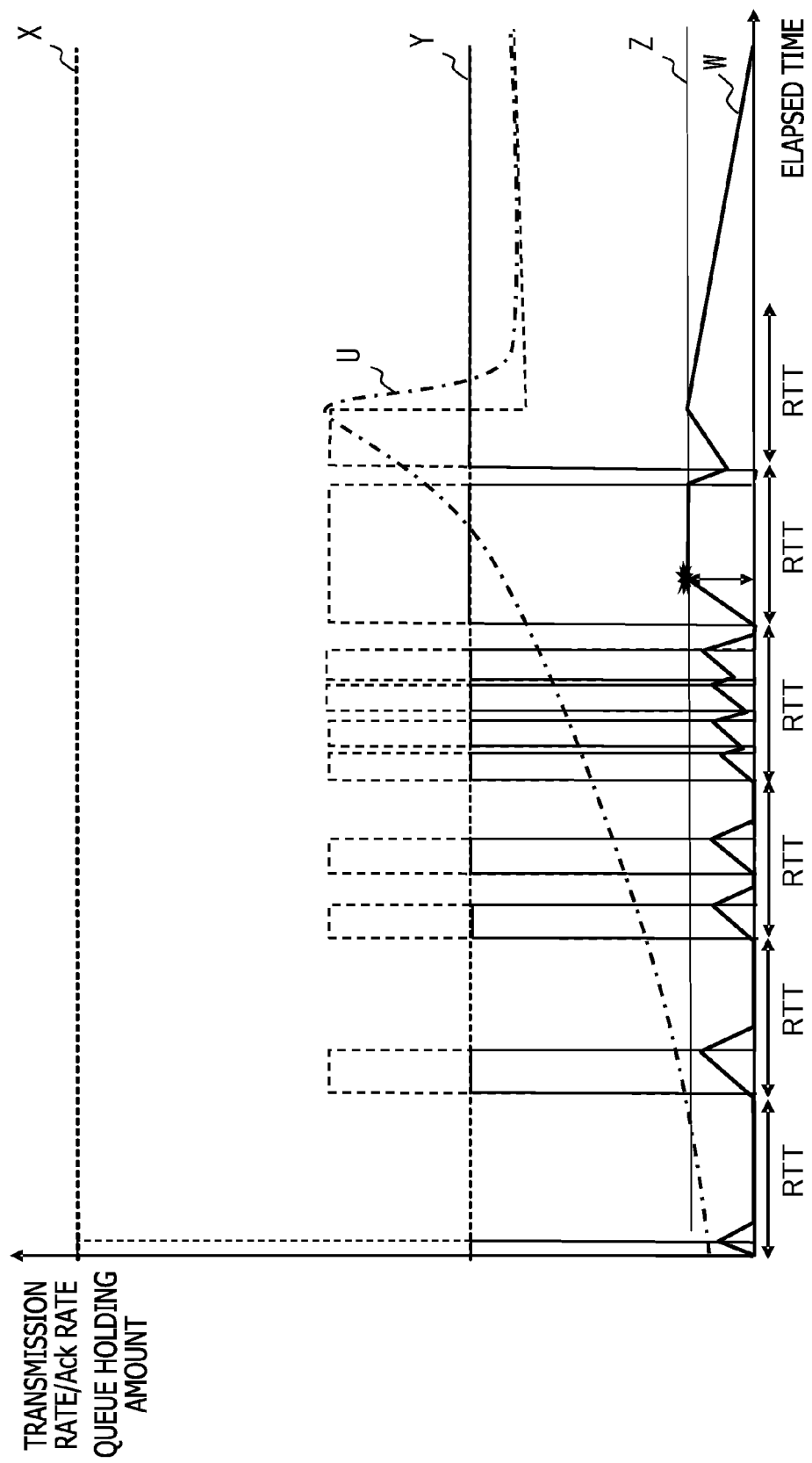
FIG. 10 is a diagram illustrating an example of fluctuations of a transmission rate in a communication device on a transmitter side.

FIG. 10 is a diagram illustrating an example of fluctuations of a transmission rate in a communication device on a transmitter side. A thin solid line in FIG. 10 indicates a reception rate when the communication device 10a receives acknowledge packets from the communication device 10b. The reception rate when receiving the acknowledge packets may be hereinafter referred to as "Ack rate". In addition, a group of acknowledge packets made to be in the form of a packet train by being successively transmitted may be referred to as "Ack train". A broken line in FIG. 10 indicates a transmission rate of packets transmitted from the communication device 10a to the communication device 10b. Alternate long and short dashed lines (U) in a graph indicate a change in a value when the transmission rates are smoothed by an RTT. Further, "X" in FIG. 10 is a maximum of the transmission rate permitted in the link L1 to which the communication device 10a is coupled. Meanwhile, "Y" is the forwarding rate permitted in the link L2 that is the bottleneck. In FIG. 10, with timing of the fluctuations in the transmission rate and the Ack rate, an example of fluctuations in the amount of use of the buffer in the relay device 50a is also indicted by a bold line (W). Further, "Z" is the capacity of the buffer in the relay device 50a.

Assume that, in a first RTT of FIG. 10, the delay processing for an acknowledge packet is not performed because the length of a packet train is yet to reach the threshold Th2. Then, as illustrated in a second RTT, the communication device 10a receives acknowledge packets as one Ack train. The communication device 10b receives packets from the communication device 10a at the forwarding rate of the bottleneck link, and therefore, the Ack rate is the forwarding rate permitted in the bottleneck link. The communication device 10a transmits a packet train while receiving the Ack train, by the processing described with reference to FIG. 9. While the processing of transmission from the communication device 10a continues, accumulation of forwarded packets in the relay device 50a continues, and therefore, the amount of use of the buffer in the relay device 50a increases during a period of transmission of the packet train, as indicated by W. Afterward, when the transmission of the packet train from the communication device 10a is stopped, the amount of use of the buffer in the relay device 50a decreases while the processing of forwarding from the relay device 50a is performed.

Assume that the packet train transmitted in the second RTT becomes a target of the delay processing of Ack, in the communication device 10b. Then, the acknowledge packets for the packets transmitted in the second RTT are divided into two Ack trains and reach the communication device 10a. The communication device 10a transmits a new packet train during the receipt of the Ack train, and therefore, in a third RTT, the communication device 10a divides transmission packets into two packet trains and transmits the two packet trains to the communication device 10b. For this reason, the packets also reach the relay device 50a as the two packet trains likewise, so that an increase in the amount of use of the buffer in the relay device 50a is suppressed, as compared with a case where the same quantity of packets reach the relay device 50a, as one packet train.

Afterward, similarly, acknowledge packets are divided into Ack trains in the communication device 10b, and therefore, the transmission intervals of the packets are made uniform, and the transmission rate of the packets resulting from the smoothing by the RTT rises as indicated by U.

When the calculated value of the delay period becomes equal to or less than a threshold Th3, the delay control section 30b of the communication device 10b determines that an effect of decreasing the amount of use of the buffer in the device coupled to the bottleneck is small because the transmission interval between the Ack trains is too short even if the Ack train is divided. Therefore, when the calculated value of the delay period becomes equal to or less than the threshold Th3, the delay control section 30b terminates the delay processing for the acknowledge packet. For example, for a packet train received in a fourth RTT in FIG. 10, the communication device 10b does not perform division processing for an Ack train. For this reason, in a fifth RTT, an Ack train is not divided, and the communication device 10a continues transmission of a packet train during the receipt of the Ack train. Then, a packet loss occurs, because the amount of use of the buffer in the relay device 50a exceeds Z.

Figure 11:
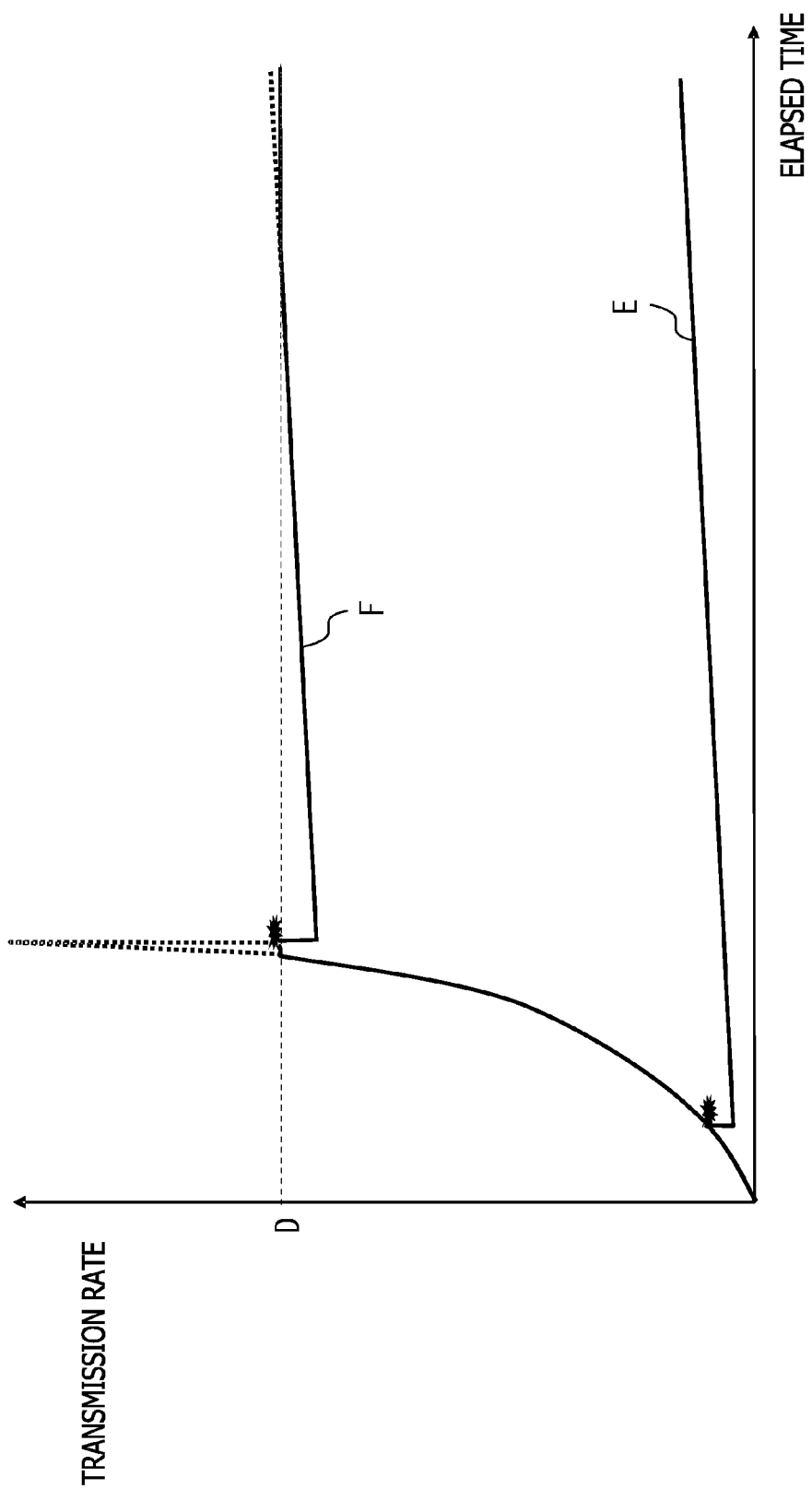
FIG. 11 is a diagram illustrating an example of a fluctuation in a transmission rate.

FIG. 11 illustrates an example of a fluctuation in a transmission rate in slow start. An example of a relationship between timing when a packet loss occurs and a time consumed for optimization of a transmission rate will be described with reference to FIG. 11. In FIG. 11, D indicates a forwarding rate of a bottleneck link. When a packet loss occurs during the slow start, the communication device 10a on the transmitter side resumes communication with the communication device 10b, after adjusting a transmission rate so that a transmission rate resulting from averaging by an RTT becomes a half of a transmission rate at the time of the occurrence of the packet loss. Therefore, when a packet loss occurs at a relatively early stage after start of slow start processing as indicated by E in FIG. 11, the device on the transmitter side performs transmission processing for packets by using a transmission rate that is half a transmission rate at the time of the occurrence of the packet loss. Afterward, the communication device 10a gradually increases the transmission rate, but increases the transmission rate more gently than during the slow start processing, and therefore, it takes a long time for the transmission rate to reach the forwarding rate in the bottleneck link.

Meanwhile, as indicated by F in FIG. 11, even if no packet loss occurs until the transmission rate exceeds the forwarding rate permitted in the bottleneck link after the start of the slow start processing, the transmission rate halves when a packet loss occurs. The slow start is terminated by the occurrence of the packet loss, but the transmission rate becomes high enough by the end of the slow start, and therefore, the length of a time until the transmission rate reaches the forwarding rate in the bottleneck link is shorter than that in the case indicated by E. In other words, the more the timing of the occurrence of a packet loss during the slow start processing is delayed, the shorter the time to be consumed for the optimization of the forwarding rate may be.

Figure 12:
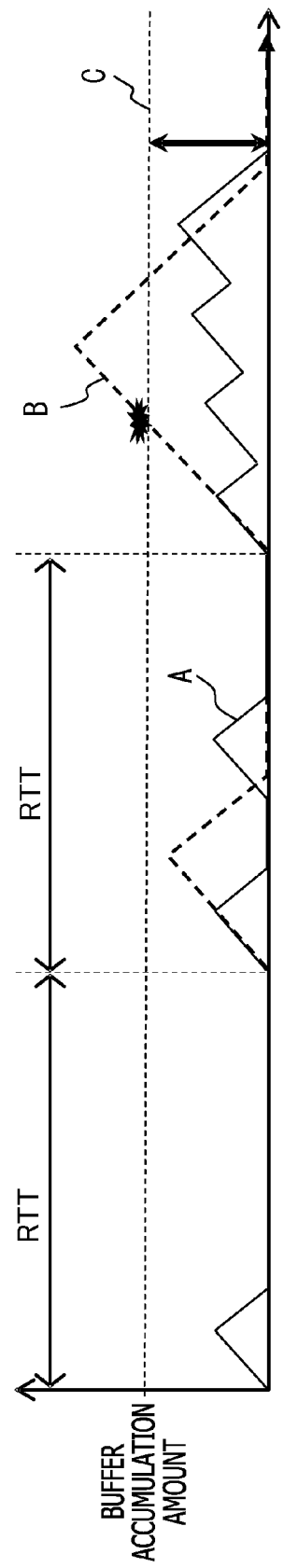
FIG. 12 is a diagram illustrating an example of an amount of use of a buffer in a device coupled to a bottleneck link.

FIG. 12 is a diagram illustrating an example of an amount of use of a buffer in a device coupled to a bottleneck link. In FIG. 12, A indicates a time change in the amount of use of the buffer in the relay device 50a that is a bottleneck, in a case where an Ack train is divided using a communication method according to the first embodiment. On the other hand, B in FIG. 12 indicates a time change in the amount of use of the buffer in the relay device 50a, in a case where an Ack train is not divided using a method according to an embodiment, and a transmission rate similar to A is used. In FIG. 12, C is the capacity of the buffer of the relay device 50a. Therefore, a packet loss occurs when the quantity of packets to be accumulated in the buffer exceeds a broken line indicated by C. When the Ack train is not divided as indicated by B, a packet train from the communication device 10a on the transmitter side is not divided either, and therefore, a packet loss occurs in a third RTT after start of communication. Meanwhile, in the case of A, the next packet train arrives after completion of processing for packets accumulated in the buffer of the relay device 50a, due to the division of the Ack train, and thus, the buffer of the relay device 50a is effectively utilized. For this reason, no packet loss occurs even after a lapse of the third RTT from the start of the communication. Therefore, a packet loss in the communication between the communication device 10a and the communication device 10b is made less likely to occur, by using the method according to the first embodiment. Due to such a decrease in the packet loss, the forwarding rate between the communication device 10a and the communication device 10b is optimized in a short time.

Figure 13:
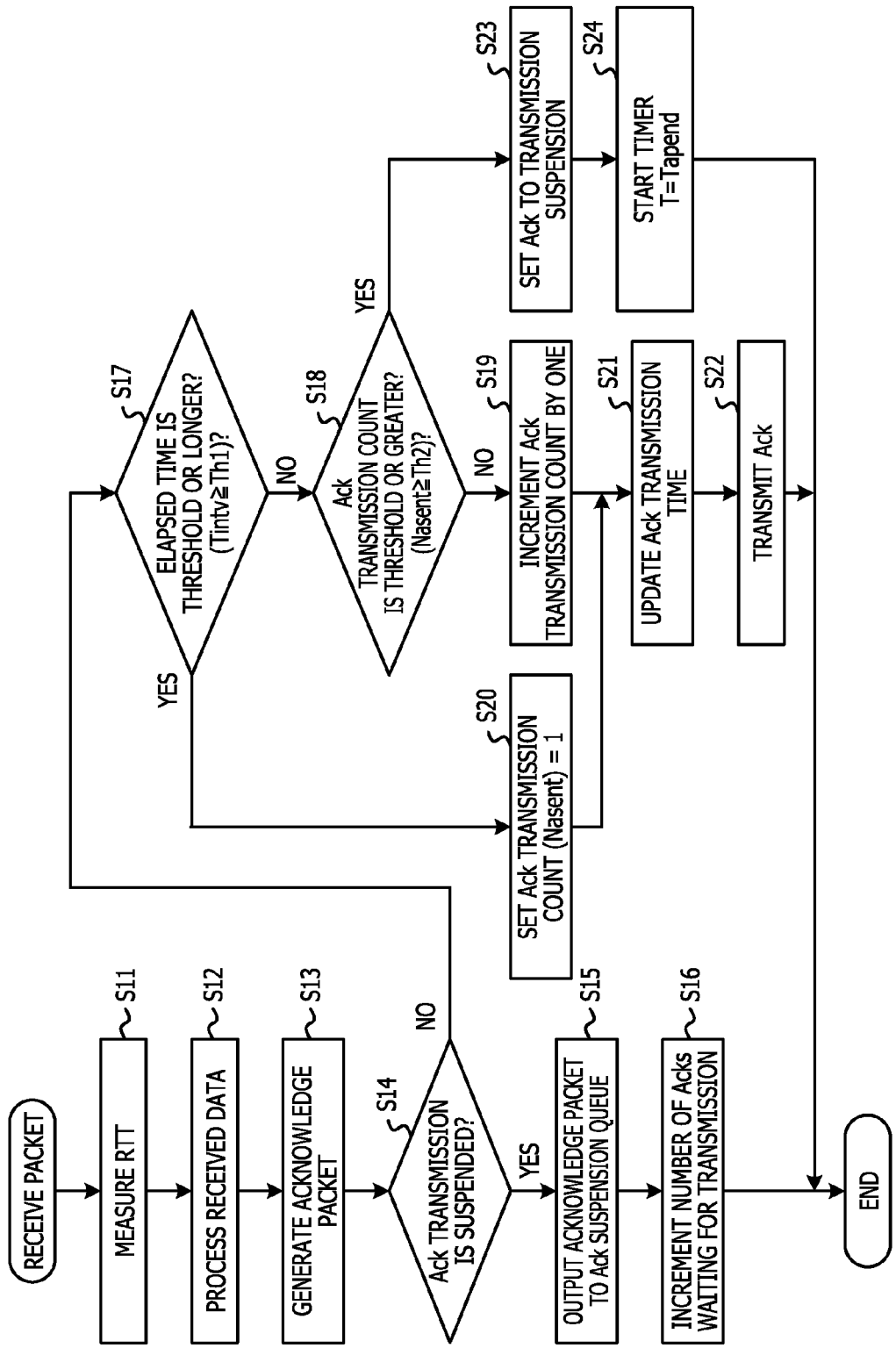
FIG. 13 is a flowchart illustrating an example of processing when a communication device on a receiver side transmits an acknowledgement.

FIG. 13 is a flowchart illustrating an example of processing when a communication device on a receiver side transmits an acknowledgement. In this flowchart, the acknowledge packet may be referred to as "Ack", to reduce the number of characters in the drawings.

The RTT measurement section 24 measures an RTT (step S11). The received-data assembly section 21 processes data in a received packet (step S12). The Ack generation section 25 generates an acknowledge packet (step S13). The delay control section 30 determines whether transmission of the acknowledge packet is suspended (step S14). When the transmission of the acknowledge packet is suspended (Yes in step S14), the acknowledge packet is outputted to the Ack suspension queue 31, and the number of acknowledge packets waiting for transmission is incremented (step S15 and step S16).

When the transmission of the acknowledge packet is not suspended (No in step S14), it is determined whether an elapsed time (Tintv) from receipt of the last packet is equal to or greater than the packet train determination threshold (Th1) (in step S17). Here, the processing in step S17 is processing of determining whether the head packet in a packet train is received. When the elapsed time from the receipt of the last packet is equal to or greater than the packet train determination threshold (Yes in step S17), the delay control section 30 sets 1 as the number (Nasent) of acknowledge packets included in an Ack train to be transmitted (step S20). The delay control section 30 changes the value of the Ack transmission time recorded in the connection management table 32, and transmits the acknowledge packets to a source of the data packets via the transmission section 13 (step S21 and step S22).

When the elapsed time from the receipt of the last packet is less than the packet train determination threshold (No in step S17), the delay control section 30 determines whether the number of the acknowledge packets in the Ack train currently being transmitted is equal to or greater than the threshold Th2 (step S18). When the number of the acknowledge packets in the Ack train currently being transmitted is less than the threshold Th2 (No in step S18), the delay control section 30 increments the number (Nasent) of the acknowledge packets included in the Ack train currently being transmitted by one (step S19). Further, the delay control section 30 changes the value of the Ack transmission time and then transmits the acknowledge packet (step S21 and step S22). When the number of the acknowledge packets in the Ack train currently being transmitted is equal to or greater than the threshold Th2 (Yes in step S18), the delay control section 30 stores the acknowledge packet to be processed into the Ack suspension queue 31, and then suspends transmission of the current and subsequent acknowledge packets (step S23). The delay control section 30 starts the timer to resume the transmission of the acknowledge packets after a lapse of a delay period (Tapend) (step S24).

Figure 14:
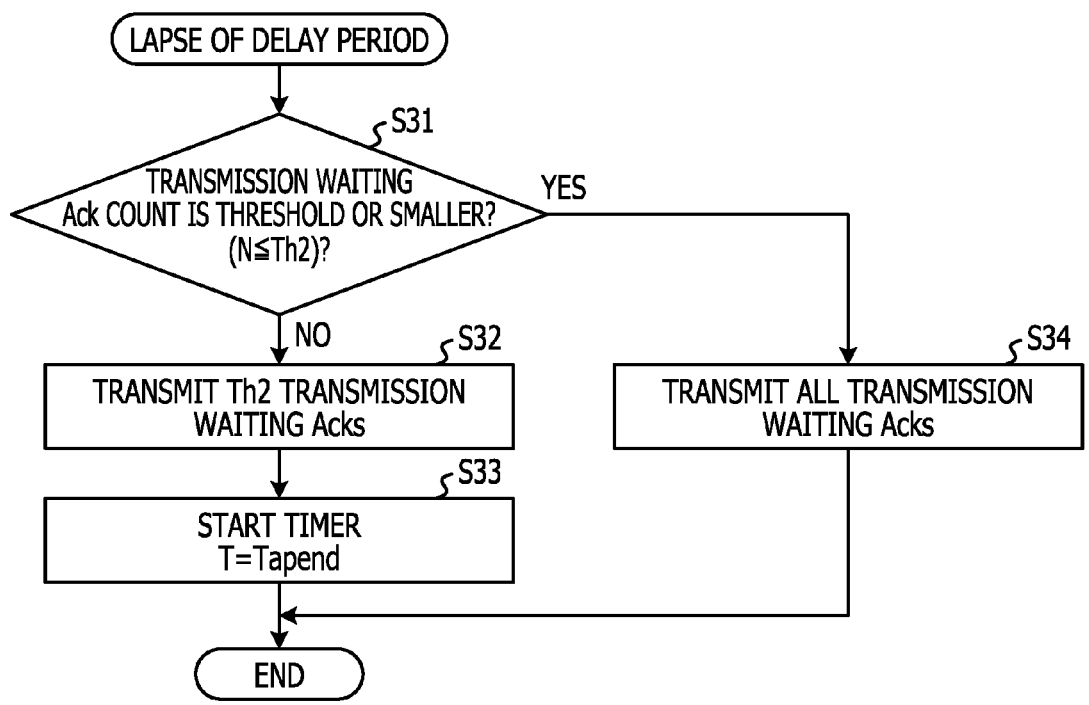
FIG. 14 is a flowchart illustrating an example of processing when a communication device on a receiver side resumes transmission of an acknowledge packet after a lapse of a delay period.

FIG. 14 is a flowchart illustrating an example of processing when a communication device on a receiver side resumes transmission of an acknowledge packet after a lapse of a delay period. After a lapse of the delay period, the delay control section 30 determines whether the number of acknowledge packets waiting for transmission is equal to or less than the threshold Th2 (step S31). When the number of acknowledge packets waiting for transmission exceeds the threshold Th2 (No in step S31), the delay control section 30 performs the transmission processing for the same number of acknowledge packets as the threshold Th2, among the acknowledge packets waiting for transmission in the Ack suspension queue 31 (step S32). The delay control section 30 starts the timer, to resume the transmission of the acknowledge packets after a lapse of the delay period (Tapend) (step S33). When the number of acknowledge packets waiting for transmission is equal to or less than the threshold Th2 (Yes in step S31), the delay control section 30 performs the transmission processing for all the acknowledge packets waiting for transmission (step S34).

In this way, according to the first embodiment, an occurrence of a packet loss during the slow start processing may be delayed as long as possible, by dividing the Ack train, and, as a result, the transmission rate may be increased before a packet loss occurs. As a result, the time to be consumed for the optimization of the transmission rate may be reduced, by using the first embodiment.

<Second Embodiment>

In the first embodiment, the case where the communication device 10 on the receiver side divides the Ack train. However, a relay device 50 in a network may divide an Ack train. In a second embodiment, a case where the relay device 50 divides the Ack will be described.

Figure 15:
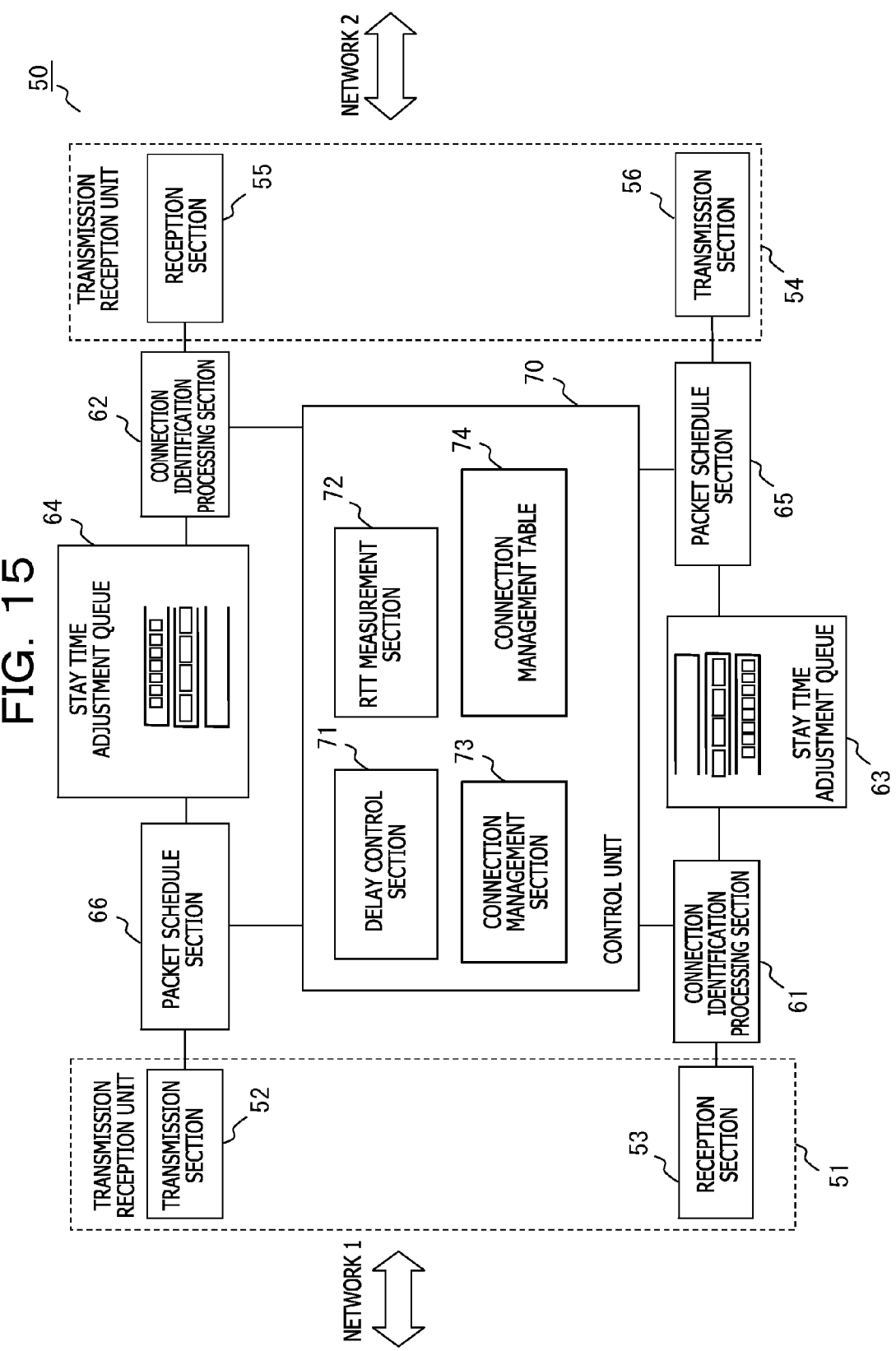
FIG. 15 is a diagram illustrating an example of a configuration of a relay device according to a second embodiment.

FIG. 15 is a diagram illustrating an example of a configuration of the relay device 50 according to the second embodiment. The relay device 50 includes transmission reception units (51 and 54), connection identification processing sections (61 and 62), stay time adjustment queues (63 and 64), packet schedule sections (65 and 66), and a control unit 70. The control unit 70 has a delay control section 71, an RTT measurement section 72, a connection management section 73, and a connection management table 74. Further, the transmission reception unit 51 has a transmission section 52 and a reception section 53, and the transmission reception unit 54 has a reception section 55 and a transmission section 56.

The RTT measurement section 72 measures an RTT between communication devices on both ends of a connection. The RTT measurement section 72 calculates the RTT, by using a time stamp in a control packet transmitted and received by a three-way handshake when the connection is established. The RTT measurement section 72 assumes a time, which is to be taken for a round trip of a packet between a communication device on a destination side and the relay device 50, to be a period from forwarding of the packet to the communication device on the destination side until acquisition of an acknowledge packet for the forwarded packet. The RTT measurement section 72 also measures a time, which is to be taken for a round trip of a packet between a communication device on a transmitter side and the relay device 50, in a similar manner. The RTT measurement section 72 determines the sum of the time to be taken for the round trip of the packet between the communication device on the transmitter side and the relay device 50, the time to be taken for the round trip of the packet between the communication device on the destination side and the relay device 50, and a delay in processing in the relay device 50, to be the RTT for the connection.

The delay control section 71 performs processing similar to the processing performed by the delay control section 30. The connection management section 73 manages information about each connection, and performs update processing for the connection management table 74. Information elements included in the connection management table 74 are similar to those in the connection management table 32 described with reference to FIGS. 8A and 8B.

FIG. 15 illustrates an example of a case where the relay device 50 relays communication between a network 1 and a network 2. The transmission reception unit 51 is used for communication between the network 1 and the relay device 50, and the transmission reception unit 54 is used for communication between the network 2 and the relay device 50.

Figure 16:
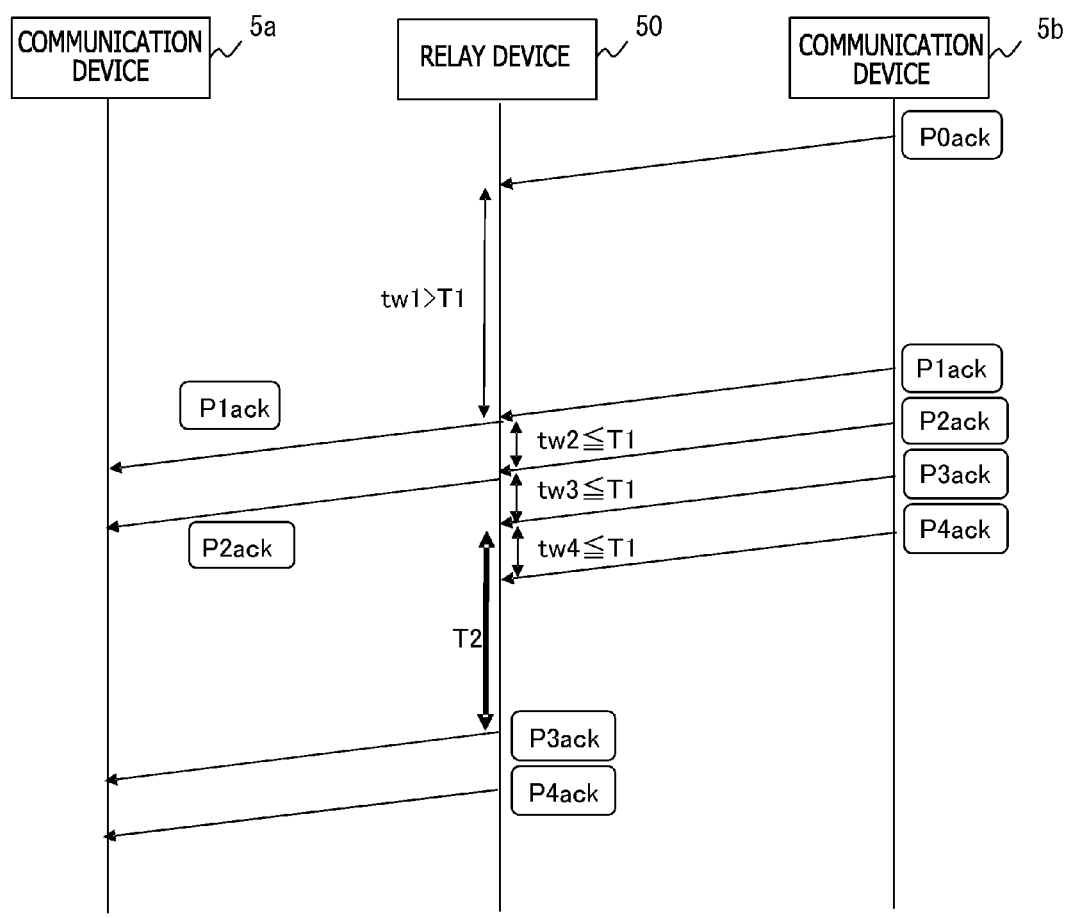
FIG. 16 is a diagram illustrating an example of communication processing according to the second embodiment.

FIG. 16 is a diagram illustrating an example of communication processing according to the second embodiment. FIG. 16 illustrates an example of communication when a communication device 5a on a transmitter side is in the network 1 and a communication device 5b to be a destination of a packet is included in the network 2. In the following description, the communication device 5a and the communication device 5b are assumed not to support the communication according to the first embodiment. There will be described below an example of processing by the relay device 50, in a case where the communication device 5a transmits packets P0 to P4 to the communication device 5b and therefore acknowledge packets (P0ack to P4ack) are transmitted from the communication device 5b to the communication device 5a. Here, a time interval between receipt of the acknowledge packet P0ack and receipt of the acknowledge packet P1ack by the relay device 50 is assumed to be tw1. Further, in the relay device 50, a reception interval between receipt of P1ack and receipt of P2ack is assumed to be tw2, a reception interval between receipt of P2ack and receipt of P3ack is assumed to be tw3, and a reception interval between receipt of P3ack and receipt of P4ack is assumed to be tw4.

Upon receipt of an acknowledge packet, the delay control section 71 of the relay device 50 determines whether acknowledge packets are successively received, by using a result of comparing a reception interval between the acknowledge packet currently received and the acknowledge packet received immediately before, with a first time (T1). When the reception interval is equal to or less than T1, the delay control section 71 determines that the acknowledge packets are successively received. In the example illustrated in FIG. 16, tw1 exceeds T1, but each of tw2 to tw4 is T1 or less. For this reason, the delay control section 71 determines that the packet P0ack and the packet P1ack are not successively received, and determines that the packet P1ack and the packet P2ack are successively received when receiving the packet P2ack following the packet P1ack.

When successively receiving acknowledge packets, the delay control section 71 does not delay forwarding processing for acknowledge packets for a predetermined quantity of data, but delays forwarding processing for acknowledge packets for data exceeding the predetermined quantity. FIG. 16 is an example of a case where the predetermined quantity is set to an amount of data to be transmitted in two packets. When receiving the acknowledge packets P1ack and P2ack successively, the delay control section 71 does not delay timing of forwarding of the acknowledge packets, because the amount of successively received data does not exceed the predetermined quantity.

Next, when the relay device 50 receives the acknowledge packet P3ack, the delay control section 71 determines that the acknowledge packets P1ack to P3ack are successively received, by using the reception interval between P2ack and P3ack. Then, the delay control section 71 determines that the amount of data for which reception is notified by the successively received acknowledgements exceeds the predetermined quantity set beforehand, and suspends forwarding of P3ack for a second time (T2), thereby delaying transmission timing of P3ack, by the second time. Similarly, when the relay device 50 receives the acknowledge packet P4ack, the delay control section 71 determines that the acknowledge packets P1ack to P4ack are successively received, because two is T1 or less. Then, the delay control section 71 delays transmission timing of P4ack, as with P3ack. A method of deciding a time length (Tapend) for which the relay device 50 delays the forwarding processing for the acknowledge packet is similar to the method of the first embodiment.

Figure 17:
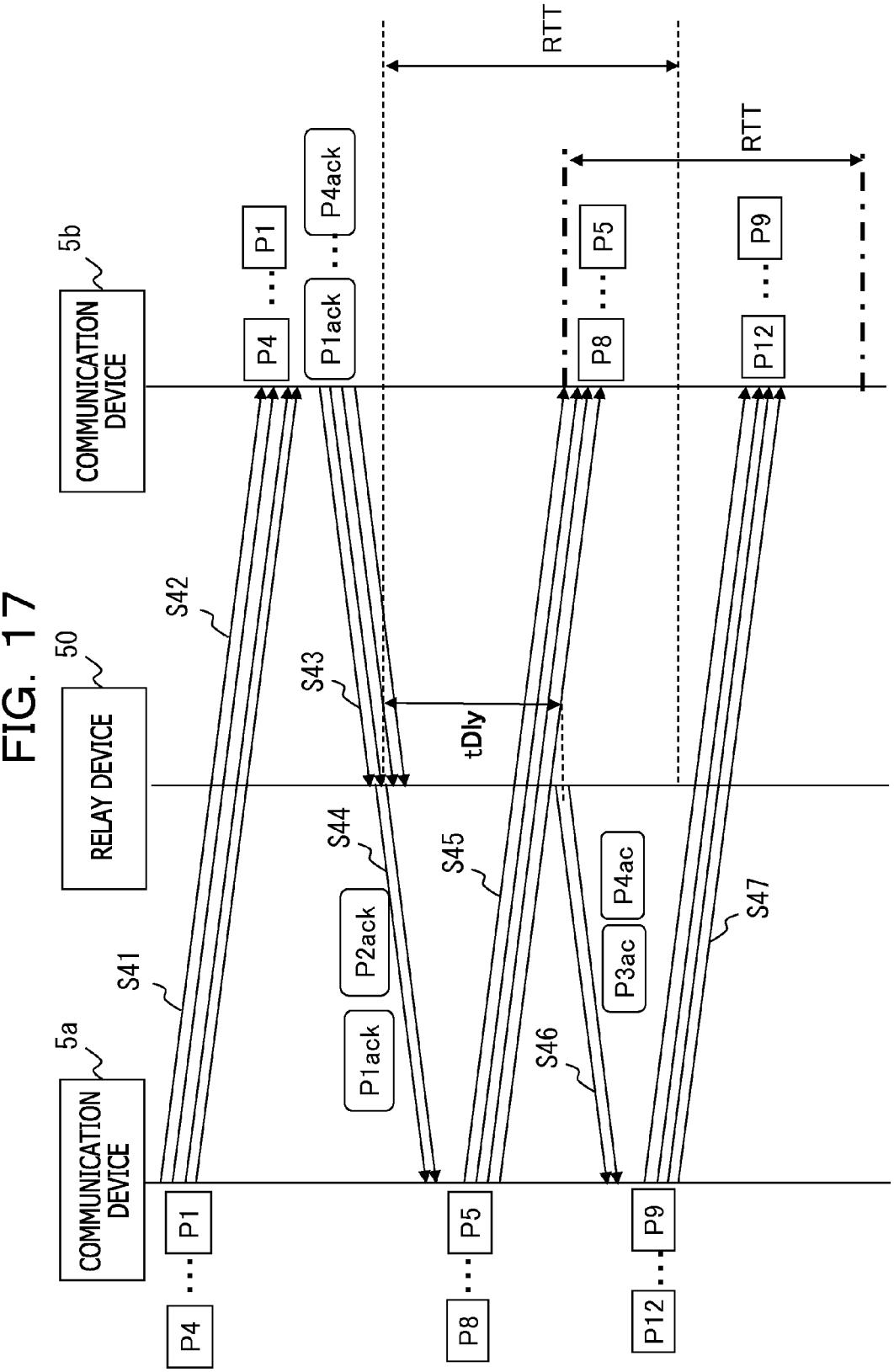
FIG. 17 is a diagram illustrating an example of timing of packet transmission/reception by communication according to the second embodiment.

FIG. 17 is a diagram illustrating timing of packet transmission/reception by communication according to the second embodiment. FIG. 17 illustrates processing from transmission processing for the packet triggering the transmission of the Ack packet described with reference to FIG. 16, until transmission of the packet performed after relaying of the Ack packet described with reference to FIG. 16.

When the communication device 5a transmits the packets P1 to P4 destined for the communication device 5b, the relay device 50 receives the packets P1 to P4 via the reception section 53 (step S41). The reception section 53 outputs the packets P1 to P4 to the connection identification processing section 61. The connection identification processing section 61 classifies data packets by connection. The connection identification processing section 61 outputs the packets P1 to P4 to any one of queues in the stay time adjustment queue 63, according to a permitted delay. A case where processing delays in the respective queues in the stay time adjustment queue 63 are different is taken as an example. The packet schedule section 65 reads out a packet from the stay time adjustment queue 63, and outputs the read-out packed to the transmission section 56.

Assume that the packets P1 to P4 are transmitted toward the communication device 5b by the transmission processing of the transmission section 56 (step S42). When successfully receiving the packets P1 to P4, the communication device 5b transmits the acknowledge packets (P1ack to P4ack) for the packets P1 to P4, toward the communication device 5a (step S43).

The relay device 50 receives the acknowledge packets P1ack to P4ack destined for the communication device 5a via the reception section 55. The connection identification processing section 62 and the delay control section 71 acquire the acknowledge packets P1ack to P4ack via the reception section 55. Here, the stay time adjustment queue 64 also has queues as with the stay time adjustment queue 63, and one of the queues is used to hold acknowledge packets as with the Ack suspension queue 31. The connection identification processing section 62 outputs the acknowledge packets P1ack to P4ack, to the queue used to hold the acknowledge packets in the stay time adjustment queue 64.

By referring to the connection management table 74, the delay control section 71 counts the number of packets in an Ack train for each RTT by connection. A way of counting the number of packets in the Ack train is similar to the processing of the delay control section 30 described with reference to FIG. 13. When the number of packets in the Ack train becomes equal to or greater than the threshold Th2, the delay control section 71 suspends the transmission of the acknowledge packets for the connection. Subsequently, after a lapse of a delay period, the transmission of the acknowledge packets is resumed, and the Ack train is divided so that the number of packets in one Ack train becomes less than the threshold Th2. The delay control section 71 notifies the packet schedule section 66 of timing of the transmission of the acknowledge packets for each connection. FIG. 17 illustrates an example of a case where the threshold Th2 is 3. In this case, the delay control section 71 does not delay the acknowledge packets P1ack and P2ack, and therefore requests the packet schedule section 66 to cause transmission of P1ack and P2ack. Meanwhile, the delay control section 71 delays timing of transmission for P3ack, by the delay period. Further, the delay control section 71 also delays timing of transmission for P4ack so that P4ack is outputted after P3ack.

The packet schedule section 66 outputs the acknowledge packet to the transmission section 52 according to notification from the delay control section 71, and therefore, P1ack and P2ack are transmitted toward the communication device 5a (step S44).

Upon receipt of P1ack and P2ack, the communication device 5a increments a congestion window, and transmits packets P5 to P8 following the packet P4, toward the communication device 5b. This processing is similar to the processing of the communication device 10a on the transmitter side described earlier in the first embodiment, for example. Processing in the relay device 50 when receiving the packets P5 to P8 is similar to the processing when receiving the packets P1 to P4, and therefore, the communication device 5b receives the packets P5 to P8 (step S45).

Meanwhile, the delay control section 71 of the relay device 50 attempts to transmit the suspended acknowledge packets, during a time from the receipt time of the packet P1ack received first among the acknowledge packets P1ack to P4ack successively received, until a lapse of an RTT, to the communication device 5a. Therefore, after a lapse of a delay period (tDly) from the transmission of the acknowledge packet P1ack, the delay control section 71 notifies the packet schedule section 66 of transmission timing for the suspended acknowledge packets P3ack and P4ack. The acknowledge packets P3ack and P4ack are transmitted to the communication device 5a, by the processing of the packet schedule section 66 and the transmission section 52 (step S46). Note that tDly is shorter than the RTT.

Upon receipt of P3ack and P4ack, the communication device 5a increments the congestion window, and then transmits subsequent packets P9 to P12 toward the communication device 5b. The relay device 50 performs forwarding processing for the packets P9 to P12, in a manner similar to other packets, and therefore, the communication device 5b receives the packets P9 to P12 (step S47).

As illustrated in FIG. 17, the relay device 50 delays the transmission of P3ack and P4ack, and therefore, the communication device 5a receives the acknowledgements for the packet train including the packets P1 to P4, as the two Ack trains. Further, the two Ack trains are transmitted to the communication device 5a within the range of the RTT. For this reason, the communication device 5a transmits the packets P5 to P12 to the communication device 5b, as the two packet trains included in the range of the RTT. Therefore, in the second embodiment as well, the transmission of the packets from the communication device 5a is smoothed within the range of the RTT, as with the first embodiment.

Similar processing is applied to a case where the device on the transmitter side is in the network 2, and the communication device serving as a destination of a packet is included in the network 1. However, in this case, a data packet to be transmitted to the communication device of the destination is relayed via the reception section 55, the connection identification processing section 62, the stay time adjustment queue 64, the packet schedule section 66, and the transmission section 52. Meanwhile, an acknowledge packet is forwarded to the network 2, via the reception section 53, the connection identification processing section 61, the stay time adjustment queue 63, the packet schedule section 65, and the transmission section 56. In this case, the delay control section 71 provides notification of transmission timing for the acknowledge packet, to the packet schedule section 65. The packet schedule section 65 outputs the acknowledge packet to the transmission section 56, in response to the notification from the delay control section 71.

In the description with reference to FIGS. 16 and 17, the case where there is no missing acknowledge packet is taken as an example for easy understanding. However, in actual communication, there may be a case where there is a missing acknowledge packet. Even in this case, the delay control section 71 does not delay acknowledge packets for notification of receipt of data less than a predetermined quantity, by using reference data whose receipt is notified as successful by an acknowledgement that is received after a lapse of a first time from an acknowledgement received immediately before. Meanwhile, the delay control section 71 delays acknowledgements for data of the predetermined quantity and subsequent data that are transmitted after the reference data.

For example, assume that, among the acknowledgements for the packets P1 to P4, the acknowledge packet (P1ack) for the packet P1 does not reach the relay device 50, from the communication device 5b. In addition, assume that the relay device 50 is set not to delay an acknowledgement related to data to be transmitted from the communication device 5a to the communication device 5b by using a packet less than the threshold Th2. In this case, the relay device 50 transmits P2ack received from the communication device 5b, to the communication device 5a, without delay. At this moment, by using P2ack, the relay device 50 recognizes receipt of data for two packets of the packets P1 and P2 by the communication device 5b. Next, when the relay device 50 receives P3ack, the delay control section 71 delays forwarding of P3ack and P4ack by a delay period. As a result, a packet train is divided.

Figure 18:
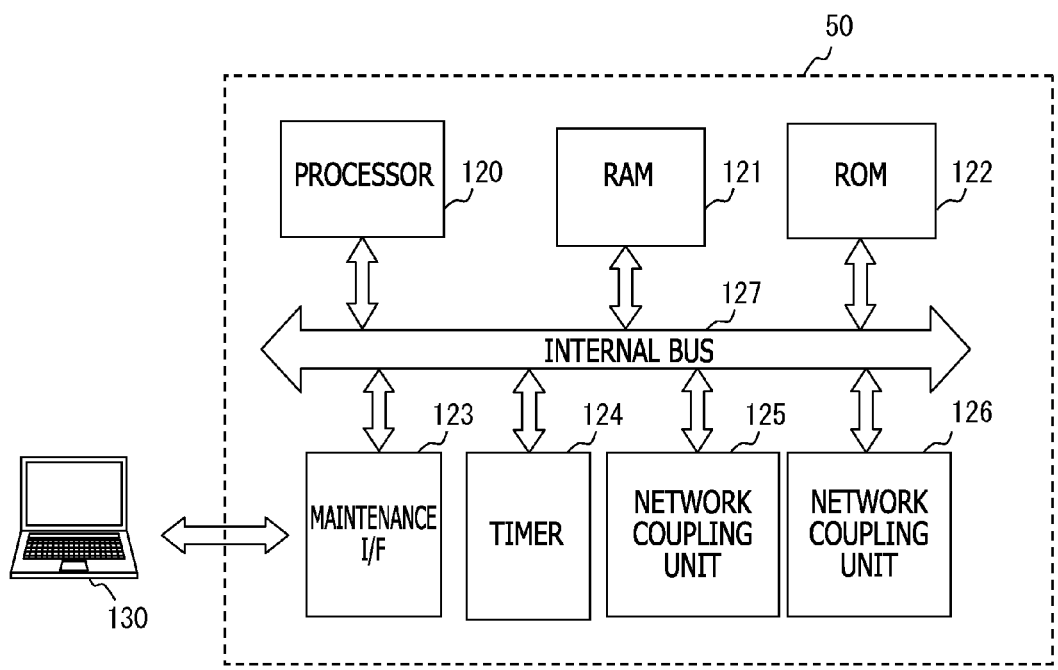
FIG. 18 is a diagram illustrating an example of a hardware configuration of the relay device according to the second embodiment.

FIG. 18 illustrates an example of a hardware configuration of the relay device 50 according to the second embodiment. The relay device 50 includes a processor 120, a RAM 121, a ROM 122, a maintenance interface (I/F) 123, a timer 124, a network coupling unit 125, a network coupling unit 126, and an internal bus 127. The processor 120 implements the connection identification processing section 61, the connection identification processing section 62, the packet schedule section 65, the packet schedule section 66, the delay control section 71, the RTT measurement section 72, and the connection management section 73. The RAM 121 operates as the stay time adjustment queue 63 and the stay time adjustment queue 64, and holds the connection management table 74. The ROM 122 stores a program to be executed in the relay device 50, data to be used for operation of the relay device 50, and the like. The timer 124 is used in processing by the delay control section 71, the RTT measurement section 72, the packet schedule section 65, the packet schedule section 66, and the like. The network coupling unit 125 operates as the transmission reception unit 51, and the network coupling unit 126 operates as the transmission reception unit 54. Further, the processor 120, the RAM 121, the ROM 122, the maintenance interface 123, the timer 124, the network coupling unit 125, and the network coupling unit 126 are coupled to one another by the internal bus 127 so that mutual input/output of data can be performed. The maintenance interface 123 is optional, and may not be included in the relay device 50. The relay device 50 holding the maintenance interface 123 is coupled to a maintenance terminal 130 via the maintenance interface 123, so that maintenance processing is performed by the maintenance terminal 130. In addition, updates of the program to be used in the relay device 50 and changes of the thresholds and the like used for the processing in the relay device 50 may be performed from the maintenance terminal 130 as appropriate.

In the second embodiment as well, by dividing the Ack train as in the first embodiment, a packet loss during the slow start processing is made to be less likely to occur, so that the time consumed for optimization of the transmission rate is reduced. In the second embodiment, the relay device 50 may divide the Ack train, and therefore may delay an occurrence of a packet loss even if a function of dividing an Ack train is not provided in the communication device on the destination side. In addition, the relay device 50 may divide the Ack train for all the connections being relayed. Therefore, in a system using the relay device 50 according to the second embodiment, processing of delaying an occurrence of a packet loss may be performed for the two or more communication devices 10, even if each of communication devices operating as the communication device on the destination side does not support the first embodiment.

<Third Embodiment 22

In a third embodiment, a case where an Ack train is divided by applying Delayed Ack of TCP to the communication device 10 on a receiver side will be described. In this case, the number of acknowledge packets to be caused to wait until a lapse of a delay period is small, and therefore, the Ack suspension queue 31 included in the communication device 10 may be small.

Figure 19:
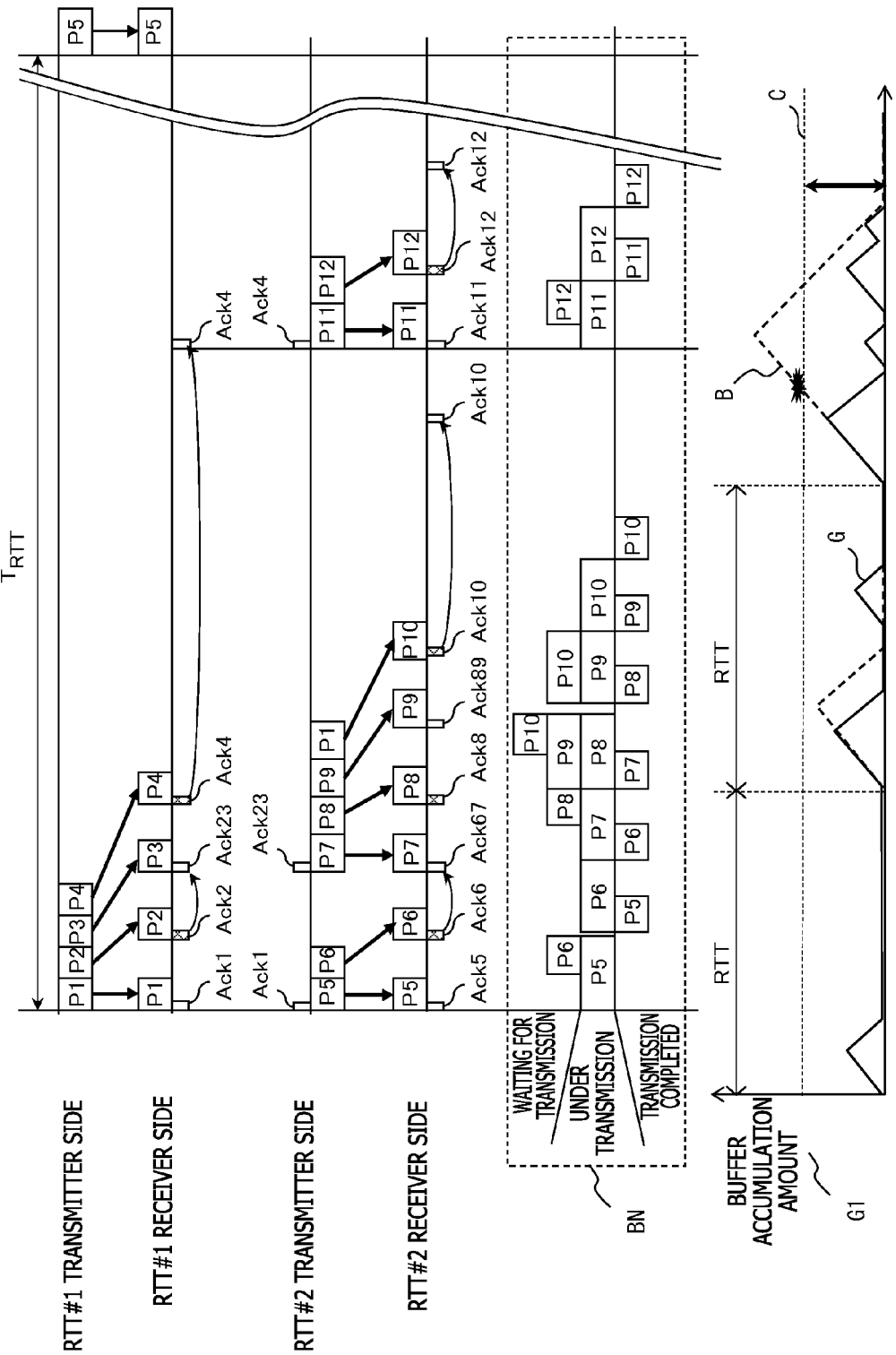
FIG. 19 is a diagram illustrating an example of a relationship between packet transmission/reception, and an amount of use of a buffer in a device coupled to a bottleneck link in the third embodiment.

FIG. 19 is a diagram illustrating an example of a relationship between packet transmission/reception, and an amount of use of a buffer in a device coupled to a bottleneck link in the third embodiment. With reference to FIG. 19 as well, a case where a data packet is transmitted from the communication device 10a to the communication device 10b by the path illustrated in FIG. 6 will be described as an example.

A top section (an RTT#1 transmitter side) of FIG. 19 illustrates transmission timing of packets from the communication device 10a in a first RTT period when communication begins. Processing to be performed when the communication device 10a transmits a packet train including four packets of packets P1 to P4 is similar to the processing in the first embodiment. In addition, timing of receiving the packets P1 to P4 by the communication device 10b is similar to the timing described with reference to FIG. 9. The timing of receiving the packets P1 to P4 by the communication device 10b is assumed to be what is illustrated in a second section (an RTT#1 receiver side) of FIG. 19. As with FIG. 9, illustrated on the RTT#1 receiver side of FIG. 19 is the timing of receiving the packets, based on receipt of the packet P1. Processing performed in the received-data assembly section 21b, the Ack information analysis section 23b, the RTT measurement section 24b, and the like of the communication device 10b is similar to the processing in the first embodiment. For example, when successfully receiving the packet P1, the Ack generation section 25b generates an acknowledge packet (Ack1) indicating that the packet P1 is successfully received, and outputs the generated acknowledge packet to the delay control section 30b.

When a time between a receipt time of a newly received packet and a receipt time of a packet received immediately before is longer than Th1, the delay control section 30b does not delay transmission of an acknowledge packet for the newly received packet. For this reason, the acknowledge packet (Ack1) for the first packet of the packet train is transmitted toward the communication device 10a without being suspended, as illustrated on the RTT#1 receiver side of FIG. 19.

Next, assume that the communication device 10b successfully receives the second packet P2 in the packet train. When an acknowledge packet (Ack2) for the second packet is inputted from the Ack generation section 25b, the delay control section 30b stores Ack2 into the Ack suspension queue 31b. The delay control section 30b notifies the Ack generation section 25b that transmission of Ack2 is delayed.

Assume that the communication device 10b successfully receives the third packet P3 in the packet train. There is the acknowledge packet held in the Ack suspension queue 31 and therefore, the Ack generation section 25b provides notification of successful receipt of the packet P3 to the delay control section 30b, without generating an acknowledge packet for the packet P3. The delay control section 30b changes a sequence number of the received packet included in Ack2 in the Ack suspension queue 31b, in response to the notification from the Ack generation section 25b. An acknowledge packet (Ack23) after this change is used to notify the communication device 10a of successful receipt of the packet P2 and the packet P3. The delay control section 30b outputs Ack23 to the transmission queue 44b, so that Ack23 is set to be transmitted to the communication device 10a. The delay control section 30b notifies the Ack generation section 25b that transmission of the acknowledge packet is completed.

Next, assume that the communication device 10b successfully receives the packet P4. There is no acknowledge packet staying in the Ack suspension queue 31b and therefore, the Ack generation section 25b generates an acknowledge packet (Ack4) for the packet P4, and outputs the generated acknowledge packet to the delay control section 30b. The delay control section 30b holds Ack4 in the Ack suspension queue 31b, either until notification of a reception result for the next packet, or until a lapse of a delay period, whichever occurs first. The delay period is a value shorter than an RTT, and is held in the connection management table 32 (FIGS. 8A and 8B) for each connection. For example, when the delay period is 30 milliseconds, the delay control section 30b outputs Ack4 to the transmission queue 44b, after holding Ack4 in the Ack suspension queue 31b for 30 milliseconds. In other words, an idle time corresponding to the delay period from transmission of Ack23 to transmission of Ack4 is provided.

After a lapse of the RTT from the receipt of the packet P1 by the communication device 10b, the delay control section 30b increments the number of elapsed RTTs in the connection management table 32b, to reduce the delay period. For example, the delay control section 30b calculates the delay period, based on $RTT/2^{(n+1)}$. Here, "n" is the value of the number of elapsed RTTs.

After a lapse of the RTT from the transmission of the packet P1 in the communication device 10a, the communication device 10a receives Ack1 from the communication device 10b, as illustrated in a third section (an RTT#2 receiver side) of FIG. 19. Packet transmission processing to be performed in the communication device 10a when the transmission of the packet P1 is successful is similar to the processing in the first embodiment. Therefore, the packets P5 and P6 are transmitted from the communication device 10a to the communication device 10b.

Illustrated in a BN of FIG. 19 is a change in the amount of use of the buffer in the relay device 50a coupled to the transmitter side of a link that becomes a bottleneck in a communication path. Upon receipt of the packet P5, the relay device 50a performs forwarding processing for the packet P5. Here, forwarding processing for one packet to the link L2 takes a time twice as long as the time consumed for transmission of one packet by the communication device 10a in the link L1. For this reason, the relay device 50a receives the packet P6 during the transmission of the packet P5, and holds the packet P6 in the buffer. After forwarding the packet P5, the relay device 50a forwards the packet P6.

Afterward, in the communication device 10a, reception processing of Ack23 is performed. Assume that successful transmission of two packets is notified by Ack23, and therefore, transmission of two packets is allowed, and a congestion window is also increased by two. Then, the communication device 10a newly transmits four packets (packets P7 to P10) to the communication device 10b.

At the time when the packet P7 reaches the relay device 50a, there is no packet staying in the relay device 50a and therefore, the relay device 50a performs forwarding processing for the packet P7. When the forwarding processing for the packet P7 is completed and then forwarding processing for the packet P8 begins, the packets P9 and P10 reach the relay device 50a, and therefore, the packets P9 and P10 are stored in the buffer of the relay device 50a. Afterward, the relay device 50a also performs forwarding processing for the packets P9 and P10 sequentially.

The communication device 10a does not transmit a new packet until receiving Ack4, while timing of the transmission of Ack4 is delayed by the communication device 10b. For this reason, as illustrated in the BN of FIG. 19, a new packet is not transmitted from the communication device 10a, until the forwarding processing for the packet P10 in the relay device 50a is completed. Therefore, the amount of space in the buffer of the relay device 50a is restored by delaying Ack4.

An example of processing when the packets P5 to P10 reach the communication device 10b is illustrated in a fourth section (an RTT#2 receiver side) of FIG. 19. When the packets P5 to P10 reach the communication device 10b, processing similar to the processing in receiving the packets P1 to P4 is performed in the communication device 10b. In other words, timing of transmission of Ack5 that is an acknowledge packet for the packet P5 is not changed. An acknowledge packet for the packet P6 is held in the Ack suspension queue 31b until receipt of the packet P7, and then transmitted to the communication device 10a after being converted into Ack67 to be used for notification of a reception result for the packets P6 and P7. Similarly, an acknowledge packet for the packet P8 is held in the Ack suspension queue 31b until receipt of the packet P9, and then transmitted to the communication device 10a after being converted into Ack89 to be used for notification of a reception result for the packets P8 and P9. The delay control section 30b holds Ack10 for notification of a reception result for the packet P10 in the Ack suspension queue 31b, either until notification of a reception result for the next packet, or until a lapse of a delay period, whichever occurs first. The delay period is reduced to 15 milliseconds, after the first RTT. The delay control section 30b holds Ack10 in the Ack suspension queue 31b for 15 milliseconds, and then transmits Ack10 to the communication device 10a. Therefore, an idle time of 15 milliseconds is provided between the transmission of Ack89 and the transmission of Ack10.

Afterward, when Ack4 reaches the communication device 10a, the communication device 10a performs reception processing for Ack4 and increments the congestion window. As a result, new packets P11 and P12 are transmitted to the communication device 10a.

As illustrated in the BN of FIG. 19, the amount of space is restored before receipt of the packet P11, and therefore, the relay device 50a performs forwarding processing for the packet P11. When receiving the packet P12 during the forwarding processing for the packet P11, the relay device 50a holds the packet P12 in the buffer, and forwards the packet P12 after the forwarding processing for the packet P11.

As illustrated on the RTT#2 receiver side of FIG. 19, upon receiving the packets P11 and P12, the communication device 10b transmits an acknowledge packet Ack11 for the packet P11, to the communication device 10. Further, the delay control section 30b holds an acknowledge packet Ack12 for the packet P12 in the Ack suspension queue 31b, either until notification of a reception result for the next packet, or until a lapse of a delay period, whichever occurs first. In the example illustrated in FIG. 19, Ack12 is transmitted to the communication device 10a, after a lapse of the delay period, in a manner similar to Ack10.

A graph G1 of FIG. 19 illustrates a result of comparing the example of the amount of use of the buffer in the relay device 50a in the third embodiment, with a case where an Ack train is not divided. In the graph G1, G indicates a time change in the amount of use of the buffer in the relay device 50a that is the bottleneck, in a case where an Ack train is divided by using a communication method according to the third embodiment. Meanwhile, B in the graph G1 indicates a time change in the amount of use of the buffer in the relay device 50a, in a case where an Ack train is not divided using a method according to an embodiment, and a transmission rate similar to G is used. In the graph G1, C is the capacity of the buffer in the relay device 50a, and a packet loss occurs when the quantity of packets to be accumulated in the buffer exceeds a dashed line indicated by C.

When the Ack train is not divided as indicated by B, a packet train from the communication device 10a on the transmitter side is not divided either, and therefore, a packet loss occurs in a third RTT after start of communication. Meanwhile, in the case of G, the next packet train arrives after processing for packets accumulated in the buffer of the relay device 50a due to dividing of the Ack train, and thus, the buffer of the relay device 50a is effectively utilized, as with the first embodiment. For this reason, no packet loss occurs even after a lapse of the third RTT from the start of the communication.

Therefore, a packet loss in the communication between the communication device 10a and the communication device 10b is made less likely to occur, by using the method according to the third embodiment. Due to the decrease of the packet loss, the forwarding rate between the communication device 10a and the communication device 10b is optimized in a short time.

In the third embodiment as well, the delay control section 30 reduces the delay period every time the Ack train is divided. When the value of the delay period becomes less than the predetermined threshold, the delay control section 30 terminates the division of the Ack train, and returns to normal Delayed Ack processing (a normal mode).

Figure 20:
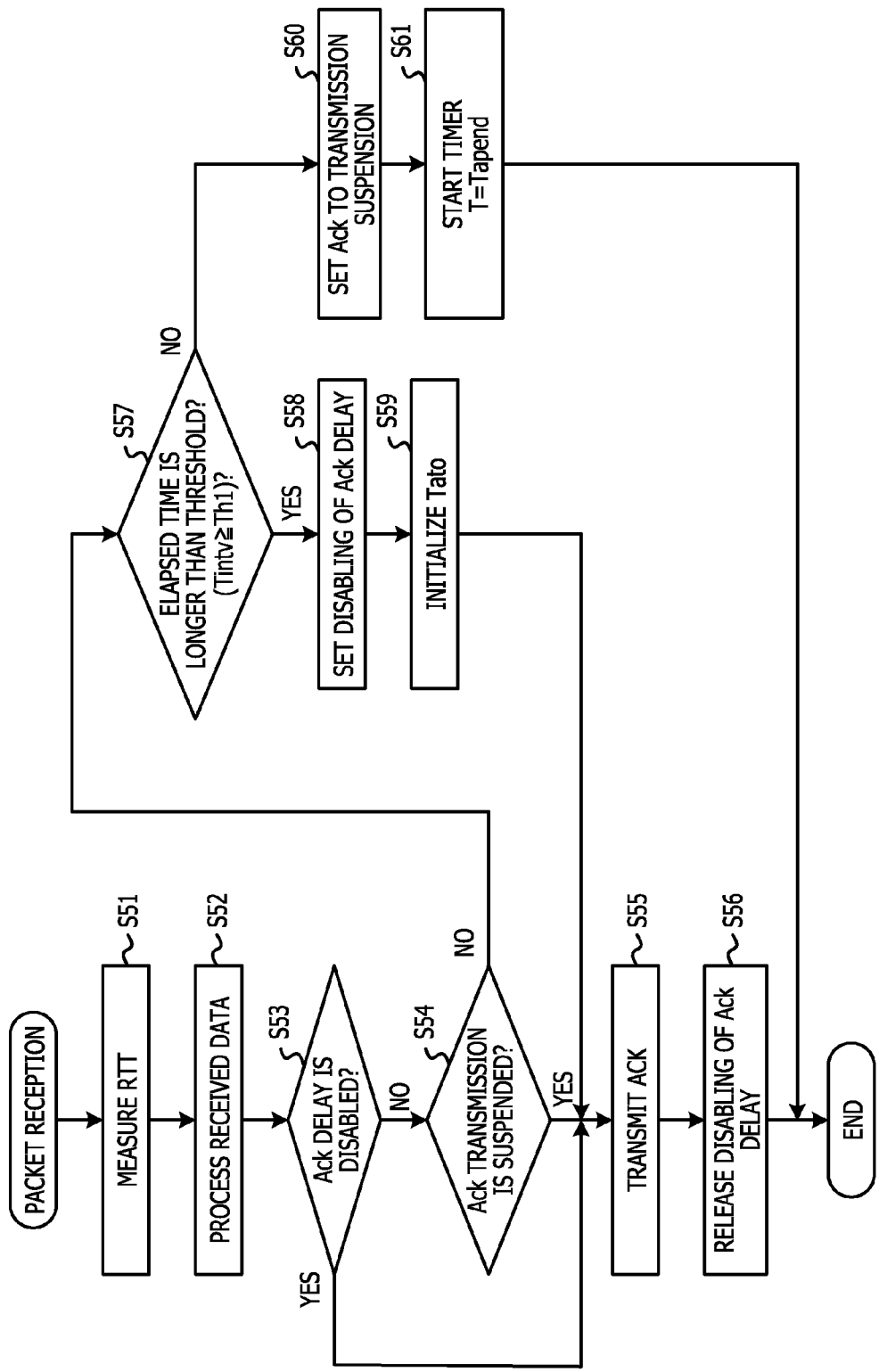
FIG. 20 is a flowchart illustrating an example of processing when a communication device on a receiver side transmits an acknowledgement.

FIG. 20 is a flowchart illustrating an example of processing when a communication device on a receiver side transmits an acknowledgement. The RTT measurement section 24 measures an RTT (step S51). The received-data assembly section 21 processes data in a received packet (step S52). The delay control section 30 determines whether delay processing for an acknowledge packet is disabled (step S53). When the delay processing for the acknowledge packet is disabled (Yes in step S53), the acknowledge packet is set to be transmitted to a source of the data packet upon generation. Therefore, the delay control section 30 changes setting of disabling of the delay processing for the acknowledge packet to "release", after transmitting the acknowledge packet (in step S55 and step S56).

Meanwhile, when the delay processing for the acknowledge packet is not disabled (No in step S53), the delay control section 30 determines whether transmission of the acknowledge packet is suspended (step S54). When the transmission of the acknowledge packet is suspended (Yes in step S54), the delay control section 30 updates the acknowledge packet and transmits the updated acknowledge packet (step S55). Afterward, processing in step S56 is performed.

When the transmission of the acknowledge packet is not suspended (No in step S54), the delay control section 30 determines whether an elapsed time (Tintv) after transmission of the last acknowledge packet exceeds the threshold Th1 (the packet train determination threshold) (step S57). Here, this processing in step S57 is processing of determining whether the head packet of a packet train is received. When the elapsed time exceeds the threshold Th1 (Yes in step S57), the delay control section 30 changes the setting of the disabling of the delay processing for the acknowledge packet to "disabled" (step S58). By this processing, the delay control section 30 sets the acknowledge packet to be transmitted forcibly, for the head packet of the packet train. Further, the delay control section 30 sets a value Tato of the timer to be used for the delay processing, to an initial value (step S59). The initial value of the value Tato of the timer is set to a half of the RTT, while the processing of dividing the Ack train is performed. Afterward, the processing in step S55 and step S56 is performed.

When the elapsed time after the transmission of the last acknowledge packet is equal to or less than the threshold Th1 (No in step S57), the delay control section 30 suspends the inputted acknowledge packet in the Ack suspension queue 31, and starts the timer (step S60 and step S61).

Figure 21:
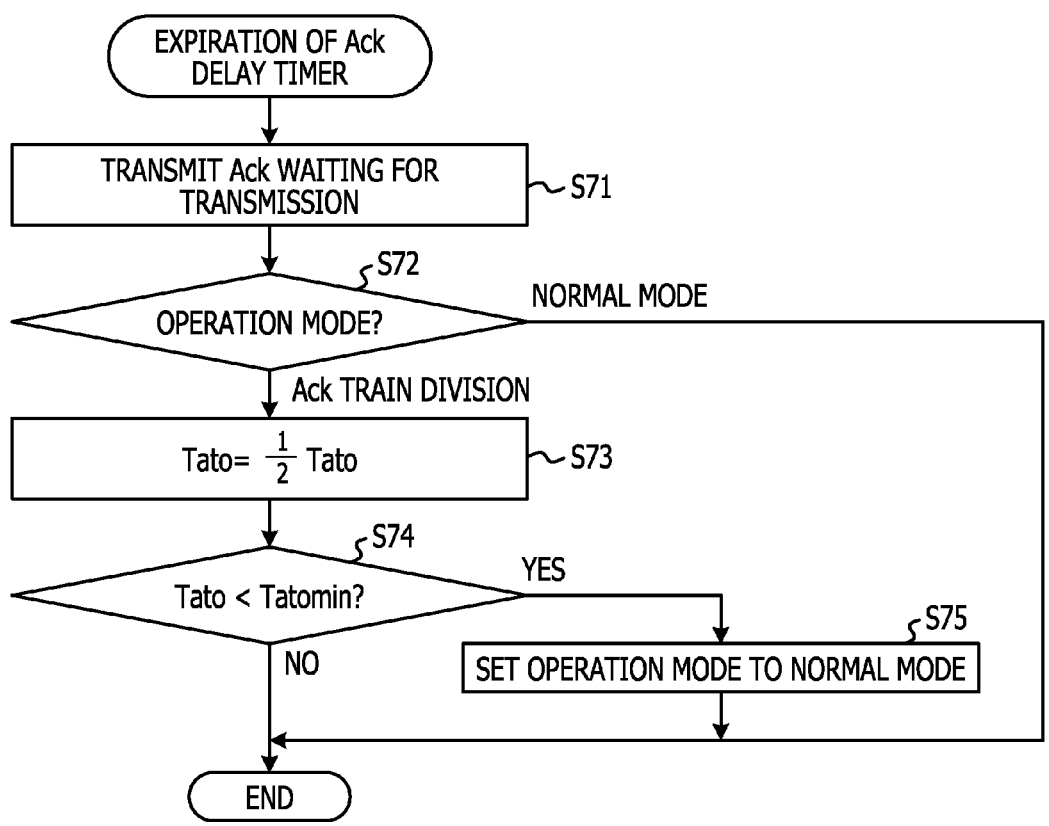
FIG. 21 is a flowchart illustrating an example of processing when a communication device on a receiver side transmits an acknowledgement by using a timer.

FIG. 21 is a flowchart illustrating an example of processing when a communication device on a receiver side transmits an acknowledgement by using a timer. When the timer expires, the delay control section 30 performs transmission processing for an acknowledge packet in the Ack suspension queue 31 (step S71). The delay control section 30 determines whether the current operation mode is the normal mode (Delayed Ack) or the division of the Ack train (step S72). When the current operation mode is the division of the Ack train, the delay control section 30 halves a set value of the timer, and determines whether the set value of the timer after being changed is less than a threshold (Tatomin) (step S73 and step S74). When the set value of the timer after being changed is equal to or greater than the threshold (Tatomin) (No in step S74), the delay control section 30 terminates the processing. When the set value of the timer after being changed is less than the threshold (Tatomin) (Yes in step S74), the delay control section 30 changes the operation mode to the normal mode (step S75). Meanwhile, when the operation mode is the normal mode (the normal mode in step S72), the delay control section 30 terminates the processing.

Figure 22:
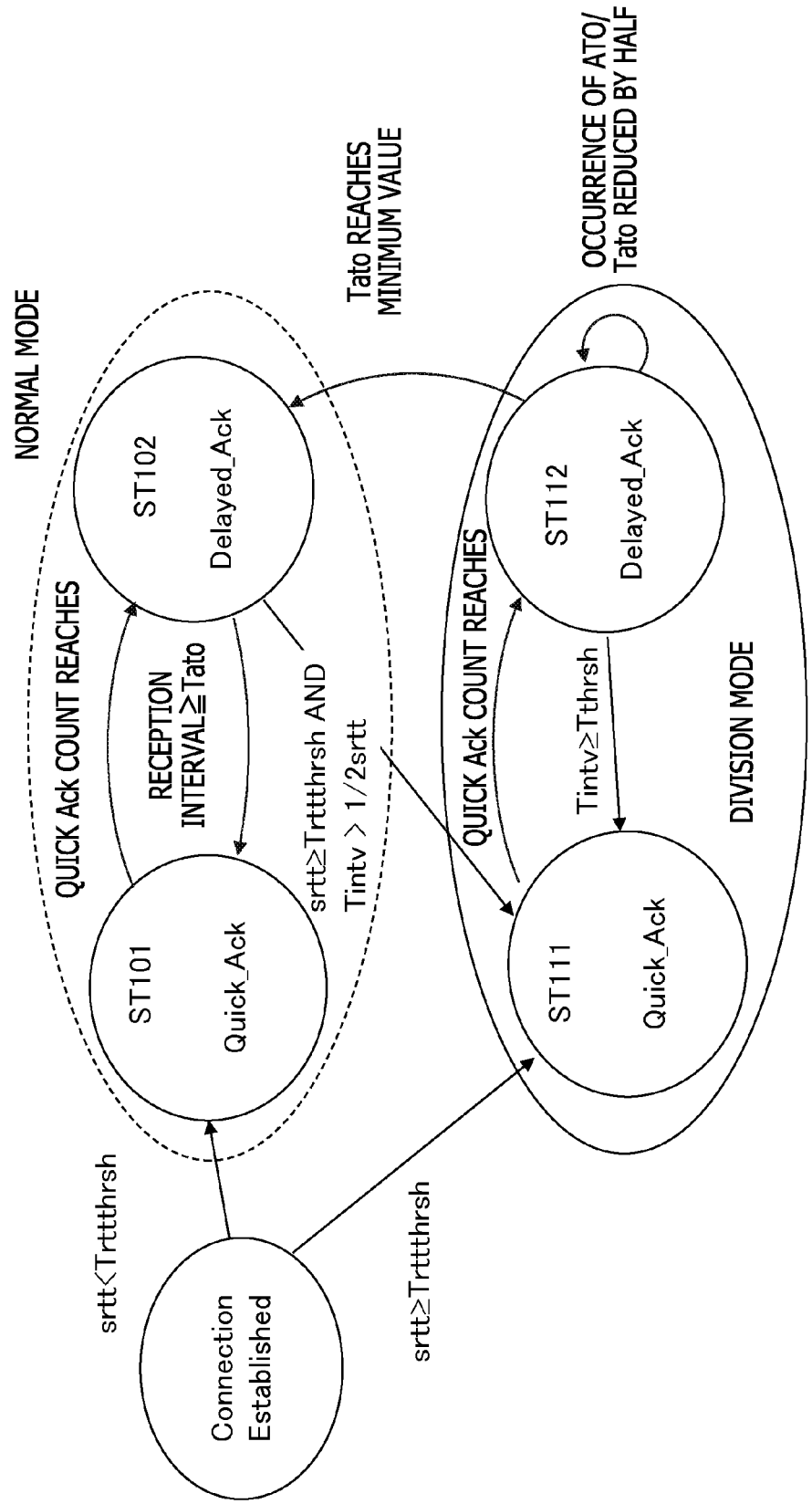
FIG. 22 is a state transition diagram illustrating an example of processing of a communication device on a receiver side.

FIG. 22 is a state transition diagram illustrating an example of processing of a communication device on a receiver side. When a value (srtt) of an RTT is equal to or greater than an RTT determination threshold (Trttthrsh) upon establishment of a connection, processing in a division mode for Ack is performed. Meanwhile, when the value (srtt) of the RTT is less than the RTT determination threshold (Trttthrsh), processing in a normal mode is performed. In the normal mode, processing of Delayed Ack is performed, but processing of forcibly transmitting an acknowledgement for the first packet in a packet train is not performed.

ST101 indicates a state where a packet, which is selected as a packet for which transmission of an acknowledge packet is not to be delayed, is in process, when the processing in the normal mode is performed. ST102 indicates a state where a packet, which is selected as a packet for which transmission of an acknowledge packet is to be delayed, is in process, when processing in Delayed Ack not in the division mode is performed. ST111 indicates a state where a packet, which is selected as a packet for which transmission of an acknowledge packet is not to be delayed, is in process, in the division mode for an Ack train. ST112 indicates a state where a packet, which is selected as a packet for which transmission of an acknowledge packet is to be delayed, is in process, in the division mode for an Ack train.

Processing for a transition from ST111 to ST112 is performed when a predetermined number of acknowledge packets are transmitted without being delayed, and this processing corresponds to the processing in step S56 of FIG. 20. Processing for a transition from ST112 to ST111 is performed when the elapsed time (Tintv) after transmission of the last acknowledge packet is longer than the threshold Th1, and this processing corresponds to the case where the result of step S57 in FIG. 20 is Yes.

Processing for a transition from ST112 to ST102 is performed when the set value (Tato) of the timer becomes smaller than the predetermined threshold, and this processing corresponds to the case where the result of step S74 in FIG. 21 is Yes and the processing in step S75 is performed. Note that, even in ST102, a transition to ST111 occurs, when the length of the RTT is equal to or longer than the RTT determination threshold (Trttthrsh), and when no packet is received for a time equal to a half or longer of the RTT from receipt of the last packet (Tintv≥½srtt). In other words, the division of the Ack train is resumed, when the length of the RTT is equal to or longer than the RTT determination threshold (Trttthrsh), and when no packet is received for the time equal to the half or longer of the RTT from the receipt of the last packet.

In the normal mode, when a predetermined number of acknowledge packets are transmitted without being delayed, a transition from ST101 to ST102 occurs, so that the delay processing for the transmission timing of an acknowledge packet is performed. Meanwhile, when a timeout for receipt of an acknowledgement for a packet occurs in a device on a source side, a transition from ST102 to ST101 takes place, so that the delay processing for the transmission timing of the acknowledge packet is terminated.

FIG. 23 is a diagram illustrating an example of a simulation result. A graph G2 of FIG. 23 illustrates a transmission rate (TR1), an Ack rate (AR1), and a change (CW1) in a congestion window value (cwnd), when the slow start is performed without dividing an Ack train. The graph G2 is a simulation result in such setting that a transition to the state of Delayed Ack (ST102 in FIG. 22) does not occur until acknowledge packets for 16 packets or more in each packet train are transmitted. The transmission rate (TR1) and the Ack rate (AR1) are plotted using a vertical axis on the left side of the graph G2, and the change (CW1) in the congestion window value is plotted using a vertical axis on the right side of the graph G2.

Meanwhile, a graph G3 of FIG. 23 illustrates a transmission rate (TR2), an Ack rate (AR2), and a change (CW2) in the congestion window value, when the slow start is performed in such setting that an Ack train is divided using the third embodiment. In both graphs, values in a period from start of the slow start processing until a packet loss is first observed are plotted. In addition, in both graphs, values smoothed by an RTT are plotted for the transmission rate and the Ack rate. The transmission rate (TR2) and the Ack rate (AR2) are plotted using a vertical axis on the left side of the graph G3, and the change (CW2) in the congestion window value is plotted using a vertical axis on the right side of the graph G3.

In the graph G3, an increasing speed of each of the transmission rate, the Ack rate, and the change in the congestion window value becomes higher, as compared with the graph G2. Further, the value of the congestion window when a packet loss is detected is 2084 when the Ack train is not divided (G2), whereas this value is 4968 when the Ack train is divided (G3).

In this way, by dividing the Ack train, an occurrence of a packet loss during the slow start processing may be delayed as much as possible, which allows an increase in the transmission rate before a packet loss occurs. As a result, the time to be consumed for optimization of the transmission rate may be reduced by using the first embodiment.

<Others>

The embodiments are not limited to the above description, and may be variously modified. Some example thereof will be described below.

FIG. 24 is a diagram illustrating a modification of the time stamp. As illustrated in FIG. 24, when coding is performed in consideration of a word boundary, an NOP may be added to the head of a time stamp to adjust a bit count.

In the above description, the case where the RTT is calculated using the time stamp during the three-way handshake is taken as an example. However, when a time stamp is included in a data packet, the RTT measurement section 24 may measure the RTT by using the time stamp in the data packet.

The RTT may be calculated without using a time stamp. In this case, the RTT is calculated, based on a time before an acknowledgement for a transmitted packet arrives. In a case of the communication device 10b on the receiver side, a time, which begins after the communication device 10b on the receiver side transmits a packet indicating permission of communication in a three-way handshake with the communication device 10a on the transmitter side to the communication device 10a, and ends before receiving an acknowledge packet for this packet, may be determined to be the RTT.

In the above description, the case, in which the initial value of the delay period is half the RTT, and the delay period is halved every time the RTT after the start of the division of the Ack train elapses, is taken as an example. However, a method of changing the delay period may be modified depending on implementation. The delay period may be calculated using an arbitrary function that may be used to smooth timing of transmission of a packet from a device on a transmitter side within a range of an RTT.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication device receiving a plurality of packets and transmitting a plurality of acknowledgement for each of the plurality of packets, the communication device comprising:
   a memory; and
   a processor coupled to the memory and configured to:
      receive a first packet at a first receipt time,
      receive a plurality of packets after the first receipt time, the plurality of packets including a second packet, a third packet and a fourth packet, the second packet being received next to the first packet at a second receipt time, an interval between the first receipt time and the second receipt time exceeding a first time period, the plurality of packets being received at an interval shorter than the first time period, the third packet being received before an Nth packet (N being a natural number more than two) counted from the second packet among the plurality of packets, and the fourth packet being any of the Nth and following packets counted from the second packet among the plurality of packets, transmit a first acknowledgement for the third packet, hold a second acknowledgement for the fourth packet for a second time period, and transmit the second acknowledgement after holding the second acknowledgement for the second time period, wherein the second acknowledgement is held for the second time period even when another packet is received by the processor after the second acknowledgement is held before the second time period elapses.

2. The communication device according to claim 1, wherein the processor is configured to hold the second acknowledgement by storing the second acknowledgement in the memory for the second time period.

3. The communication device according to claim 2, wherein the processor is configured to transmit the first acknowledgement without storing the first acknowledgement in the memory for the second time period.

4. The communication device according to claim 3, wherein the processor is configured to:

store the second acknowledgement he second time period in the memory if a third acknowledgement different from the first acknowledgement is not held at a time of generation of the second acknowledgement, and transmit the second acknowledgement without storing the second acknowledgement for the second time period in the memory if the third acknowledgement is held at the time of generation of the second acknowledgement.

5. The communication device according to claim 3, wherein when a round trip time (RTT) between the communication device and a transmitting device is equal to the second time period, the processor is further configured to reduce the length of the second time period.

6. The communication device according to claim 5, wherein the processor is configured to stop processing of holding the second acknowledgement for the second time period, when the second time period becomes shorter than a threshold.

7. The communication device according to claim 5, wherein the second time period is shorter than the RTT.

8. The communication device according to claim 1, wherein the communication device receives a plurality of packets including the third packet between the second packet and the fourth packet, and transmits a plurality of acknowledgement for each of the plurality of packets including the third packet between the second packet and the fourth packet without holding the plurality of acknowledgement for the second time period.

9. The communication device according to claim 1, wherein data amount of a plurality of packets from the second packet to the Nth packet is over a predetermined value.

10. A relay device that performs relay processing between a communication device and a transmitting device, the relay device comprising:

a memory; and a processor coupled to the memory and configured to:

receive a first acknowledgement for a first packet at a first receipt time, receive a plurality of acknowledgements for a plurality of packets after the first receipt time, the plurality of acknowledgements including a second acknowledgements for a second packet, a third acknowledgement for a third packet and a fourth acknowledgement for a fourth packet, the second acknowledgement being received next to the first acknowledgement at a second receipt time, an interval between the first receipt time and the second receipt time exceeding a first time period, the plurality of acknowledgements being received at an interval shorter than the first time period, the third acknowledgement being received before an Nth acknowledgement (N being a natural number more than two) counted from the second acknowledgement among the plurality of acknowledgements, and the fourth acknowledgement being any of the Nth and following acknowledgements counted from the second acknowledgement among the plurality of acknowledgements, transmit the third acknowledgement, hold the fourth acknowledgement for a second time period, and transmit the fourth acknowledgement after holding the fourth acknowledgement for the second time period, wherein the second acknowledgement is held for the second time period even when another packet is received by the processor after the second acknowledgement is held and before the second time period elapses.

11. The relay device according to claim 10, wherein the processor is configured to hold the second acknowledgement by storing the second acknowledgement in the memory for the second time period.

12. The communication method according to claim 11, wherein the communication device holds the second acknowledgement by storing the second acknowledgement in a memory in the communication device for the second time period.

13. The communication method according to claim 12, wherein the communication device transmits the first acknowledgement without holding the first acknowledgement in the memory for the second time period.

14. The communication method according to claim 12, wherein the communication device stores the second acknowledgement in the memory for the second time period if a third acknowledgement different fro the first acknowledgement is not stored in the memory at a time of generation of the second acknowledgement, and transmits the second acknowledgement without storing the second acknowledgement for the second time period in the memory if the third acknowledgement is stored in the memory at the time of generation of the second acknowledgement.

15. The communication method according to claim 11, wherein when a round trip time (RTT) between the communication device and a transmitting device is equal to the second time period, the communication device is further configured to reduce the length of the second time period.

16. The communication method according to claim 15, wherein the communication device stops processing of holding the second acknowledgement for the second time period, when the second time period becomes shorter than a threshold.

17. The relay device according to claim 10, wherein when a round trip time (RTT) between the communication device and the transmitting device is equal to the second time period, the processor is further configured to reduce the length of the second time period.

18. The relay device according to claim 10, wherein the processor is configured to stop processing of holding the fourth acknowledgement for the second time period when the second time period becomes shorter than a threshold.

19. The relay device according to claim 10, wherein the second time period is shorter than the RTT.

20. A communication method that uses a transmitting device and a communication device, the communication method comprising:

receiving, by the communication device, a first packet at a first receipt time;

receiving, by the communication device, a plurality of packets after the first receipt time, the plurality of packets including a second packet, a third packet and a fourth packet, the second packet being received next to the first packet at a second receipt time, an interval between the first receipt time and the second receipt time exceeding a first time period, the plurality of packets being received at an interval shorter than the first time period, the third packet being received before an Nth packet (N being a natural number more than two) counted from the second packet among the plurality of packets, and the fourth packet being any of the Nth and following packets counted from the second packet among the plurality of packets;

transmitting, by the communication device, a first acknowledgement the third packet;

holding, by the communication device, a second acknowledgement for the fourth packet for a second time period; and transmitting, by the communication device, the second acknowledgement after holding the second acknowledgement for the second time period, wherein the second acknowledgement is held for the second time period even when another packet is received by the processor after the second acknowledgement is held and before the second time period elapses.

\* \* \* \* \*